US008672652B2

(12) United States Patent
Munakata et al.

(10) Patent No.: US 8,672,652 B2
(45) Date of Patent: Mar. 18, 2014

(54) HIGH-PRESSURE FUEL SUPPLY PUMP AND THE MANUFACTURING METHOD

(75) Inventors: Akihiro Munakata, Hitachinaka (JP); Hideki Machimura, Tokai (JP); Kazutaka Hosokawa, Hitachinaka (JP)

(73) Assignee: Hitachi, Ltd., Tokyo (JP)

( * ) Notice: Subject to any disclaimer, the term of this patent is extended or adjusted under 35 U.S.C. 154(b) by 1054 days.

(21) Appl. No.: 12/261,753

(22) Filed: Oct. 30, 2008

(65) Prior Publication Data
US 2009/0110575 A1 Apr. 30, 2009

(30) Foreign Application Priority Data
Oct. 31, 2007 (JP) ................................. 2007-282607

(51) Int. Cl.
*F04B 19/00* (2006.01)
(52) U.S. Cl.
USPC ......................................................... 417/437
(58) Field of Classification Search
USPC ......................................................... 417/437
See application file for complete search history.

(56) References Cited

U.S. PATENT DOCUMENTS

| 5,921,760 A * | 7/1999 | Isozumi et al. ............... 417/470 |
| 2006/0119199 A1* | 6/2006 | Seo ................................. 310/91 |

FOREIGN PATENT DOCUMENTS

| EP | 1 348 868 A1 | 10/2003 |
| EP | 1 637 270 A1 | 3/2006 |
| FR | 2 892 651 A1 | 6/2007 |
| JP | 2004-17048 A | 1/2004 |
| JP | 2005-279778 A | 10/2005 |
| JP | 2005-342782 A | 12/2005 |
| WO | WO 02/055881 A1 | 7/2002 |
| WO | WO 2006/069819 A1 | 7/2006 |

OTHER PUBLICATIONS

European Search Report dated Dec. 2, 2010 (six (6) pages).

* cited by examiner

*Primary Examiner* — Nimeshkumar Patel
*Assistant Examiner* — Jacob R Stern
(74) *Attorney, Agent, or Firm* — Crowell & Moring LLP

(57) ABSTRACT

In order to provide a welded structure of and welding method for two metallic parts fitted together at a tubular section in a high-pressure fuel supply pump, an electric current is supplied to any of the welding connection surfaces formed between a pump housing and cylinder in a high-pressure fuel supply pump, between the pump housing and an installation flange, between the pump housing and an intake or discharge joint, between the pump housing and a pulsation-absorbing damper cover, between the pump housing and a relief valve mechanism, and between the pump housing and an electromagnetically driven intake valve mechanism. The two sections are pressed against each other to generate, along the connection surface, a plastic flow not causing melting or fusion due to heat, and form a diffusion-weld region at the connection surface by using the plastic flow and the application of the pressure.

14 Claims, 14 Drawing Sheets

ENLARGED VIEW OF REGION P

ENLARGED VIEW OF REGION R BEFORE WELDING

CONTACT SURFACE W8 AFTER WELDING

ENLARGED VIEW OF REGION R AFTER WELDING

HIGH-PRESSURE FUEL SUPPLY PUMP AND THE MANUFACTURING METHOD

BACKGROUND OF THE INVENTION

1. Field of the Invention

The present invention relates generally to high-pressure fuel supply pumps and their manufacturing methods. More particularly, the invention relates to a welded structure in which two metals, after being fitted at an annular or tubular section, are tightly connected together at the fitting-in portions by welding.

2. Description of the Related Art

JP-A-2005-342782 and JP-A-2004-17048 discloses techniques in which a tubular metal is fitted into a hole of another tubular metal before the two metals are connected together by welding.

According to the above Publications, the two metals are connected together by supplying an electric current while applying pressure to the fitting-in portions.

Meanwhile, there are other known different techniques for realizing a welded structure comprising a cylinder of a high-pressure fuel supply pump and a housing of the pump. That is, International Publication Pamphlet WO2002/055881 proposes a technique that employs fixing with a fastening jig intended to bring both metals into contact with each other and thus form a sealing section. Also, International Publication Pamphlet WO2006/069819 proposes a technique in which, after peripheral surface sealing of the cylinder by press-fitting, an end of the cylinder is fixed to the pump housing by staking. Additionally, JP-A-2005-279778 discloses connecting the two annular or tubular metals by welding the entire contact surface between both metals, at the fitting-in portions thereof, with a laser.

SUMMARY OF THE INVENTION

There are a number of sections in a high-pressure fuel supply pump where two tubular metals, namely, a cylinder and a pump housing, for example, are to be connected together in a fitted condition. These sections to be connected have traditionally been adopted in the welded structures that involve staking, screw fastening, laser welding, or the like. These structures, however, have the problems of insufficient fluid sealability and insufficient connecting strength. In addition, laser welding, in particular, has the problem that since a change in the composition of the material itself due to heat causes magnetic characteristics to change randomly before and after connecting, this connecting method is unsuitable for magnetic circuits. Furthermore, laser welding causes the metals to suffer dimensional changes due to thermal deformation before and after connecting, and thus makes it impossible to maintain initial design dimensions.

An object of the present invention is to provide a welded structure comprising two metallic parts fitted together in a tubular section of a high-pressure fuel supply pump, and a method for obtaining such a welded structure. This welded structure is formed so that the metallic parts can be tightly connected together within a short time by staking (press-fitting included), screw fastening, or laser welding. In addition, this welded structure is formed so as to be sufficient in connecting strength and in fluid sealability, and so that the metallic parts are essentially free from changes in composition of their metallic materials due to heat.

More specifically, the present invention provides a welded structure and welding method suitable for use at any one of connections between a "pump housing and cylinder", "pump housing and installation flange", "pump housing and intake or discharge joint", "pump housing and pulsation-absorbing damper cover", and "pump housing and electromagnetically driven intake valve mechanism", in addition to "pump housing and relief valve mechanism", of a high-pressure fuel supply pump.

In order to achieve the above object, the present invention provides the following as aspects thereof:

A) A connection between a pump housing and a cylinder fitted into a hole of the pump housing, the connection being formed so as to include those weld surfaces of both metals which are inclined to a central axis of the cylinder, and being constructed so that plastic flow regions of the metals are formed along each of the weld surfaces, at both sides of each. For indirect fixing of the cylinder to the pump housing via a fixing ring fitted into another hole of the pump housing, the above weld surfaces are formed between the pump housing and the fixing ring.

This connection is formed by applying a voltage between the pump housing and the fixing ring, as well as between the pump housing and the cylinder, thus supplying an electric current to the weld surfaces, and further applying a pressure to both metals axially in a relative fashion with peripheries of the weld surfaces heated by the current.

B) A connection between an installation flange and a pump housing cylindrical section fitted into a hole of the installation flange, the connection being formed so as to include those weld surfaces of both metals which are inclined to a central axis of the cylindrical section, and being constructed so that plastic flow regions of the metals are formed along each of the weld surfaces, at both sides of each.

This connection is formed by applying a voltage between the installation flange and the pump housing, thus supplying an electric current to the weld surfaces, and further applying a pressure to both metals axially in a relative fashion with peripheries of the weld surfaces heated by the current.

C) A connection between a pump housing and an intake or discharge joint, the connection being formed so as to include those weld surfaces of both metals which are inclined to a central axis of the intake or discharge joint, and being constructed so that plastic flow regions of the metals are formed along each of the weld surfaces, at both sides of each.

This connection is formed by applying a voltage between the installation flange and the pump housing, thus supplying an electric current to the weld surfaces, and further applying a pressure to both metals axially in a relative fashion with peripheries of the weld surfaces heated by the current.

D) A connection between a cylindrical outer wall of a pump housing and a damper cover of a pulsation-absorbing damper mechanism, the connection being formed so as to include those weld surfaces of both metals which are inclined to a central axis of the cylindrical outer wall, and being constructed so that plastic flow regions of the metals are formed along each of the weld surfaces, at both sides of each.

This connection is formed by applying a voltage between the pump housing and an intake or discharge joint, thus supplying an electric current to the weld surfaces, and further applying a pressure to both metals axially in a relative fashion with peripheries of the weld surfaces heated by the current.

E) A connection between a pump housing and a housing of a relief valve mechanism, the connection being formed so as to include those weld surfaces of both metals which are inclined to a central axis of the housing of the relief valve mechanism, and being constructed so that plastic flow regions of the metals are formed along each of the weld surfaces, at both sides of each.

This connection is formed by applying a voltage between the pump housing and the housing of the relief valve mechanism, thus supplying an electric current to the weld surfaces, and further applying a pressure to both metals axially in a relative fashion with peripheries of the weld surfaces heated by the current.

F) A connection between a pump housing and a housing of an electromagnetically driven intake valve mechanism, the connection being formed so as to include those weld surfaces of both metals which are inclined to a central axis of the housing of the electromagnetically driven intake valve mechanism, and being constructed so that plastic flow regions of the metals are formed along the weld surfaces, at both sides of each thereof.

This connection is formed by applying a voltage between the pump housing and the housing of the electromagnetically driven intake valve mechanism, thus supplying an electric current to the weld surfaces, and further applying a pressure to both metals axially in a relative fashion with peripheries of the weld surfaces heated by the current.

The above-constructed connections in the present invention yield the following advantageous effects:

A) The inclined weld surfaces of both metals (the pump housing and the cylinder or the fixing ring) shut off a leakage fuel pathway between a pressurizing chamber and atmospheric air, such that in addition to establishing connection between the pump housing and the cylinder or between the pump housing and the fixing ring, sealing between these sections can be achieved at the same time.

Advantages of a method for manufacturing this high-pressure fuel supply pump are listed below.

a) When the two metals are pressurized in a relative fashion with respect to the inclined weld surfaces, the plastic flow is accelerated by pressurizing both metals (to such an extent that the metals do not melt or fuse) while supplying a current between the metals. Therefore, relative axial press-fitting depths of the pump housing and the cylinder can be increased and an after-cooling radial repulsive force stored within the plastic flow regions can be correspondingly enhanced. Consequently, large welding force can be obtained at the weld surfaces.

b) In addition, since atoms of the two metals become diffused into respective structures of both and tightly adhere to one another in a mirror-like condition at a boundary of the weld surfaces, sufficiently high frictional resistance (adhesion) can be obtained thereon. This keeps the corresponding surfaces non-slippery after welding.

c) Since the mirror-like tight weld surfaces of the diffused metals are inclined, a connection area of each weld surface is much greater than that of a press-fitting surface of a tubular section. These inclined weld surfaces help ensure a sealing distance and area great enough for sealing between a fuel to be pressurized and the atmosphere.

B) In addition to the diffusion-weld surfaces of both metals, formed at the inclined welding connection with respect to the installation flange for installing the pump housing at an installation member, the plastic flow regions at both sides of each diffusion-weld surface can have a welding connection area much wider than that achievable by laser welding. Strong connecting force against vibration, therefore, can be obtained. The diffusion weld regions where melting or fusion due to heat does not occur cause no heat deterioration of the metallic materials.

During the manufacture of the high-pressure fuel supply pump, laser welding has the problem that after welding, a central position of the pump and that of a hole for installation at an engine body suffer random changes due to thermal deformation. The method according to the present invention, however, is advantageous in that since the weld surfaces do not reach temperature levels as high as the melting or fusion temperatures of the metals, and since an automatic aligning (centering) effect can be obtained during the relative pressurization for welding, design dimensions to the central position of the pump and that of the installation hole can be maintained, even after welding.

Providing a press-fitting depth restriction surface suppresses lateral pump swinging or oscillation at this abutting surface, making the pump stronger against vibration.

C) Since the inclined diffusion-welding connection with respect to the intake joint or discharge joint for introducing a fluid into the pump housing forms a sealing portion between the fluid existing inside, and the atmosphere, no special sealing mechanism is required and a sealing area greater than by laser welding can be obtained. High sealing reliability can therefore be obtained as an advantage.

Regarding the manufacture of the high-pressure fuel supply pump, diffusion welding is advantageous over laser welding in that a time from completion of setup in a welding jig to completion of welding is short, and hence in that productivity is high.

D) The welding connection between the damper cover and the pump housing is effective in that the diffusion weld surfaces of both metals, inclined to the central axis of the cylindrical outer wall of the pump housing, form a sealing portion between the fluid existing inside, and the atmosphere.

The pressure applied during welding is transmitted to the damper disposed inside the damper chamber, via a holding member, and the damper is pressed against and held at the pump housing by the applied pressure.

Since the section to be welded, unlike that of laser welding, does not reach a high temperature, changes in axial or radial dimensions of this section due to thermal strain do not occur during or after welding. The axial dimensions of this section existing before and after it is welded, therefore, can be accurately calculated by managing properly the press-fitting depth based on the welding pressure. In addition, provided that the corresponding section is press-fitted so that a central axis thereof existing after welding will match a central axis existing before welding, a centripetal action will work automatically and both central axes will match.

Furthermore, there is an advantage in that because of no thermal strain occurring, a force that holds down the damper remains unchanged, even after welding.

E) The inclined diffusion-weld surfaces of both metals, formed at the connection between the pump housing and the housing of the relief valve mechanism, function as a sealing mechanism to seal a high-pressure component and low-pressure component of the fuel, so there is an advantage in that there is no need to provide a second sealing mechanism. Unlike sealing provided by press-fitting, the above sealing function only requires a low sealing (welding) pressure, thus causing no such secondary problem as deformation of an internal pathway during sealing, and consequently raising a production yield.

Additionally, since an automatic centripetal action works centrally upon a hole of the pump housing during welding, there is an advantage in that a flow of the fluid does not depart from initial design data after welding.

F) The inclined diffusion-weld surfaces of both metals, formed at the connection between the pump housing and the housing of the electromagnetically driven intake valve mechanism, also have an advantage in that the weld surfaces function as a mechanism to provide sealing between the fuel existing inside, and the atmosphere.

Additionally, since the central axis of the electromagnetically driven intake valve mechanism is automatically directed toward the hole center of the pump housing during welding, there is an advantage in that after welding, the intake valve and a valve seat thereof do not shift in position.

There is a further advantage in that since the pressure applied during welding presses a distal end of the housing of the electromagnetically driven intake valve mechanism against a peripheral section of an entrance of the pressurizing chamber, sealing between the pressurizing chamber and a low-pressure fuel chamber can be achieved.

DESCRIPTION OF THE PREFERRED EMBODIMENTS

Hereunder, embodiments of the present invention will be described referring to the accompanying drawings.

Figure 1:
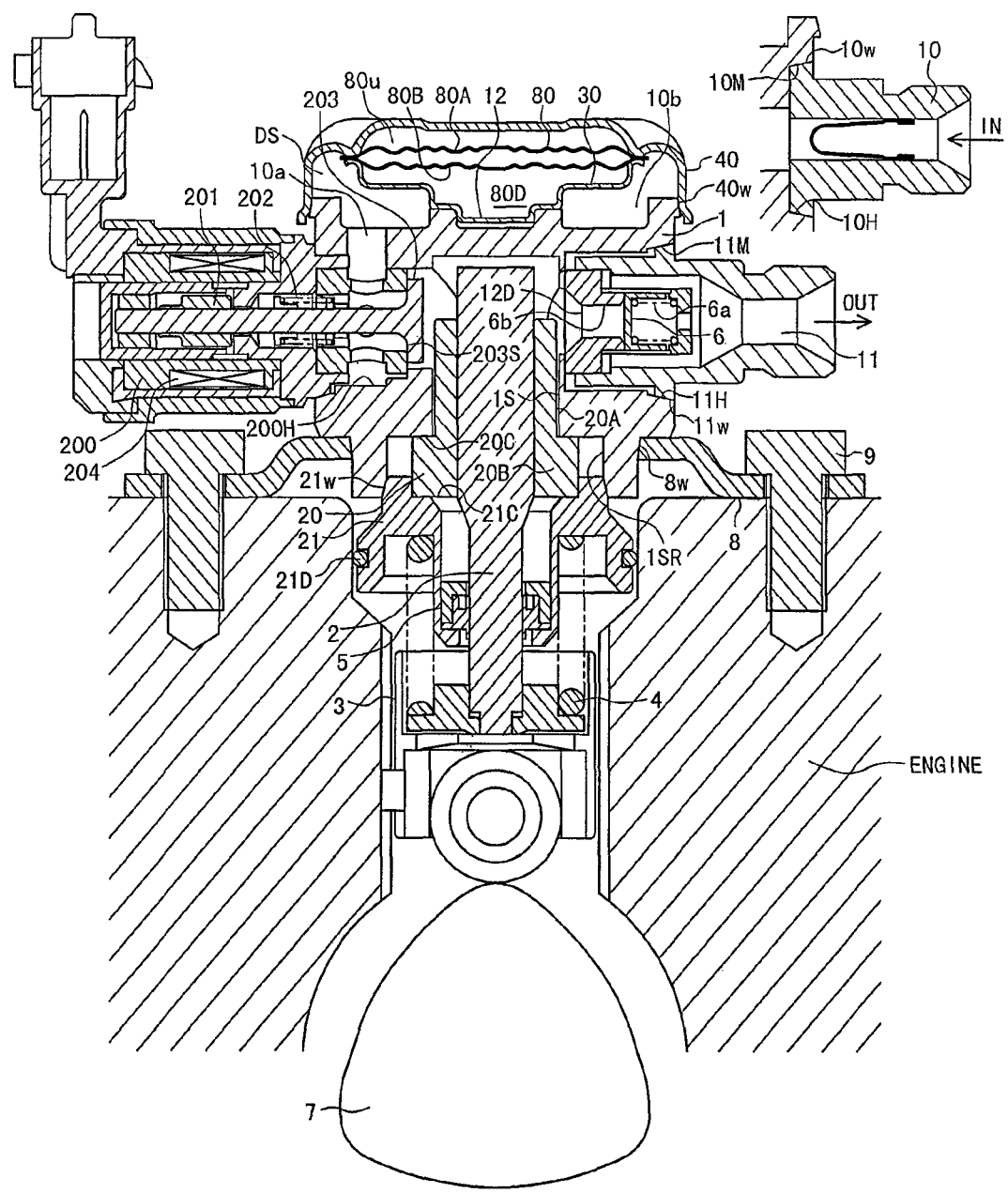
FIG. 1 is a longitudinal cross-sectional view of an entire high-pressure fuel supply pump according to an embodiment of the present invention.

FIG. 1 is a longitudinal cross-sectional view of an entire high-pressure fuel supply pump embodying the present invention.

Figure 2:
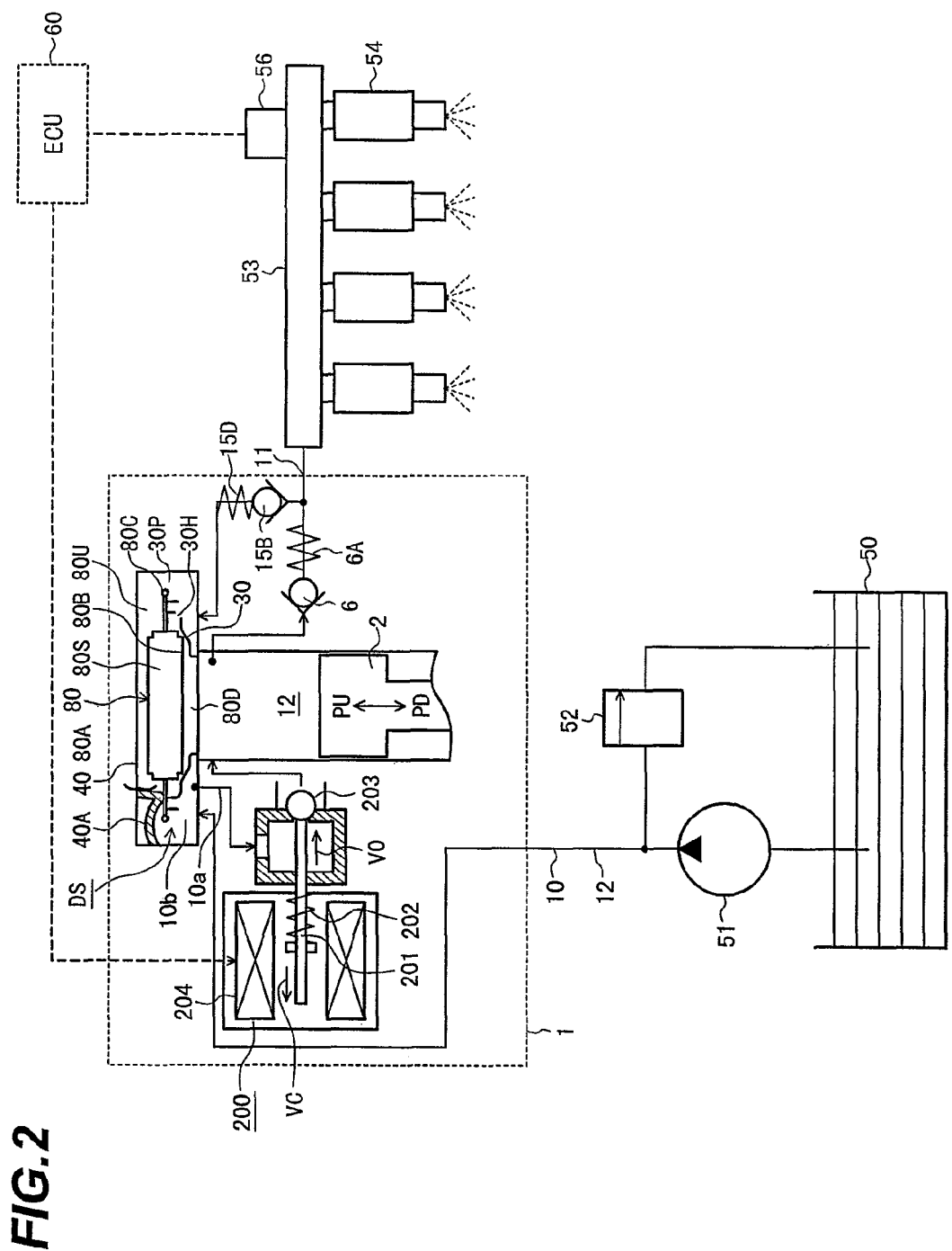
FIG. 2 is a system block diagram showing an example of a fuel feed system which uses the high-pressure fuel supply pump of the first embodiment.

FIG. 2 is a system diagram representing an example of a fuel feed system which uses the high-pressure fuel supply pump embodying the present invention.

An intake joint 10 for introducing a fuel into an intake pathway (low-pressure pathway) and a discharge joint 11 for feeding the fuel into a high-pressure pathway are connected to a pump housing 1.

A pressurizing chamber 12 for applying pressure to the fuel is formed midway in the fuel pathways extending from the intake joint 10 to the discharge joint 11.

The pressurizing chamber 12 is formed by a recess formed in the pump housing 1. The recess forming the pressurizing chamber 12 includes a tubular surface 1S. The tubular surface 1S may include a plurality of tubular portions each having a different diameter.

The discharge joint 11 has a discharge valve 6. The discharge valve 6 is mechanically biased by a spring 6a so as to operate in a predetermined direction for closing a discharge port of the pressurizing chamber 12 and constitutes a so-called check valve to limit the circulating direction of the fuel.

Part of an electromagnetically driven intake valve mechanism 200 is inserted within a tubular hole 200H formed on part of a peripheral wall of the pump housing 1, and a weld surface is formed between a peripheral surface of the electromagnetically driven intake valve mechanism 200 and the tubular hole 200H. This weld surface will be detailed later per FIGS. 13 and 14.

The tubular hole 200H hermetically sealed by installation of the electromagnetically driven intake valve mechanism 200 is constituted as an intake chamber 10a.

The electromagnetically driven intake valve mechanism 200 includes a plunger rod 201 having the intake valve 203 integrated with the rod at a distal end thereof. In order for the intake valve 203 to always remain in contact with a valve seat 203S formed at a distal end of the electromagnetically driven intake valve mechanism 200, the plunger rod 201 is mechanically biased by a spring 202 disposed therearound for insertion of the plunger rod through the spring. The detailed configuration will be described later.

Accordingly, when the electromagnetically driven intake valve mechanism 200 is off (electric power is not supplied to an electromagnetic coil 204), the plunger rod 201 is biased by the spring 202 so as to operate in the closing direction of the intake valve 203. When the electromagnetically driven intake valve mechanism 200 is off, therefore, unless no other force is exerted upon the intake valve 203, the plunger rod 201 and the intake valve 203 will be maintained at the closing position of the intake valve, as shown in FIG. 1.

The fuel is guided by a low-pressure pump 51 to flow from a fuel tank 50 into the intake joint 10 serving as a fuel inlet of the pump housing 1.

This fuel is regulated to a constant pressure by a pressure regulator 52.

Injectors 54 and a pressure sensor 56 are mounted on a common rail 53. The injectors 54 are provided for as many as cylinders as are provided in the engine and inject into each cylinder a high-pressure fuel which has been supplied to the common rail 53 in accordance with an incoming signal from an engine control unit (ECU) 60.

A relief valve 15 of a relief valve mechanism built into the pump housing 1 opens to return an excess high-pressure fuel to the upstream side of the discharge valve 6 when the internal pressure of the common rail 53 exceeds a predetermined level. In this preferred embodiment, while the excess high-pressure fuel is returned to a damper chamber DS (described later) provided in the low-pressure pathway, it may instead be returned to the pressurizing chamber 12 or to any position in the low-pressure pathway ranging from the intake joint 10 to the intake valve 203 provided that the destination is located upstream with respect to the discharge valve 6. The operation of the relief valve 15 prevents damage to the high-pressure fuel line.

A lifter 3 provided at a lower end of a piston plunger 2 is pressed against a cam 7 by a spring 4. The piston plunger 2 is slidably held in the cylinder 20, and the cam 7 rotated by an engine camshaft or the like makes the piston plunger 2 reciprocate to change the The cylinder 20 has its peripheral surface held by a cylinder holder 21. The cylinder 20 is connected to the pump housing 1 by welding this cylinder holder 21 to the pump housing 1 (this welded structure will be detailed later).

The cylinder holder 21 has a plunger seal 5 to seal a peripheral surface of the piston plunger 2.

The closing of the intake valve 203 during a compression stroke of the piston plunger 2 increases the internal pressure of the pressurizing chamber 12, thus causing the discharge valve 6 to open automatically for releasing the pressurized fuel within the pressurizing chamber to the common rail 53.

During a downward movement of the piston plunger 2 from an upper dead center to a lower dead center, the internal pressure of the pressurizing chamber 12 decreases below that of the low-pressure pathway positioned at an upstream side of the intake valve 203. The intake valve 203 opens when that differential pressure increases above a force of the spring 202.

Under normal operating conditions, when the internal pressure of the pressurizing chamber 12 decreases below that of the low-pressure pathway positioned at the upstream side of the intake valve 203 and the differential pressure increases above the force of the spring 202, this differential pressure forces the plunger rod 201 out in a direction of the right side of the drawing, thus separating the intake valve 203 from the valve seat 203S, and opening the intake valve. If electric power is supplied to the electromagnetic coil 204 under this state, the movement of the plunger rod 201 in the direction of the right side of the drawing can be maintained or assisted with a weak current.

However, the fuel supply pump is constructed so that an electromagnetic force greater than the mechanical biasing force of the spring 202 is generated by supplying electric power to the electromagnetically driven intake valve mechanism 200. Even if the differential pressure between front and rear positions of the intake valve 203 does not exceed the force of the spring 202, therefore, the electrical energizing of the electromagnetically driven intake valve mechanism 200 will push the plunger rod 201 out to the right of the drawing, separate the intake valve 203 from the valve seat 203S, and open the intake valve.

When the electromagnetically driven intake valve mechanism 200 is in an electrically de-energized state, the plunger rod 201 is pressed against the valve seat 203S by the biasing force of the spring 202 and closed.

During an intake stroke of the piston plunger 2, the electromagnetically driven intake valve mechanism 200 is electrically energized to feed the fuel into the pressurizing chamber 12. During the compression stroke, the electromagnetically driven intake valve mechanism 200 is electrically de-energized to pressure-feed an appropriate amount of fuel into the common rail according to the particular decrement in the volume of the pressurizing chamber 12.

At this time, if the electrically energized state of the electromagnetically driven intake valve mechanism 200 is maintained during the compression stroke, the intake valve 203 will remain open, and the internal pressure of the pressurizing chamber 12 will maintain a low-pressure state essentially equal to the internal pressure of the low-pressure pathway positioned at the upstream side of the intake valve 203. The amount of fuel commensurate with the decrement in the volume of the pressurizing chamber 12 will therefore be returned to the upstream side of the intake valve. If this event actually happens, the corresponding stroke may also be called an overflow stroke.

Therefore, if, during the compression stroke, the electromagnetic coil 204 is switched from the energized state to the non-energized state, since the pressure-feeding of the fuel into the common rail 53 will be immediately started, the amount of fuel discharged toward the common rail 53 will be controllable.

In this way, the pump repeats three steps: taking the fuel from the intake joint 10 into the pressurizing chamber 12 with the reciprocating motion of the piston plunger 2, and then discharging the fuel from the piston plunger 2 into the common rail 53 or returning the fuel from the pressurizing chamber 12 to the intake pathway.

At this time, the return of the fuel from the pressurizing chamber 12 to the intake pathway generates pulsations in the internal fuel pressure of the intake pathway. In order to absorb these pulsations in the low-pressure pathway, the damper chamber 10b is formed midway in the pathway extending from the intake joint 10 to the intake chamber 10a, and inside the damper chamber, a twin-type metallic diaphragm damper 80 is stored in sandwiched form between a damper cover 40 and a damper holder 30.

The damper cover 40 has a peripheral region formed into a tubular shape, fitted into a tubular section of the pump housing 1, and fixed by welding.

The twin-type metallic diaphragm damper 80 is formed by arranging one pair of (upper and lower) metallic diaphragms 80A and 80B, end to end, and welding the outermost peripheral region thereof over its entire surface, for internal sealing. This welded structure will be described in further detail later.

A hollow section formed by the two metallic diaphragms 80A and 80B is filled with an inert gas such as argon. This hollow section changes in volume according to a particular change in external pressure, thereby to perform a pulsation-dampening function.

The installation flange 8 connected to the pump housing 1 by welding is secured to a required position of the engine by means of screws 9, whereby the high-pressure fuel supply pump is fixed.

The installation flange 8 is required to have sufficient strength against a reaction force of an in-cylinder pressure developed during the compression stroke of the piston plunger 2, a compressive repulsion of the spring 4, and an external force due to an overall pump weight including the as-filled fuel weight of the pump (also including an engine vibrational acceleration component). The welded structure between the installation flange 8 and the pump housing will be detailed later.

Next, the welded structure and welding method according to the present invention will be described using FIG. 3.

Two metals W1 and W2 to be joined together by welding are sandwiched between an upper welding electrode D1 and a lower welding electrode D2.

The welding electrodes D1, D2 are installed in a press and electrically connected to a welding transformer.

Energy that has been stored into a capacitor is discharged toward the welding transformer, and an amplified current is instantaneously supplied to regions at which the metals D1, D2 to be joined together come into contact with each other. Both metals D1, D2 are heated by the supplied current. Also, an alloyed zone is formed as a diffusion zone on an entire contact-interfacial surface by frictional heat generated during pressure application, and the two metals D1, D2 are thus joined together. A welding current supply time, the number of current supply operations, and current supply timing are controlled by a control device. The welding current supply time per operation is 1 second or less, so heat input to the intended metals can be minimized, and thermal deformation, compared with that of laser welding, can be reduced significantly. In addition, because of diffusion welding, dissimilar metals such as an iron-based metal and an aluminum-based metal can also be joined together.

Figure 4:
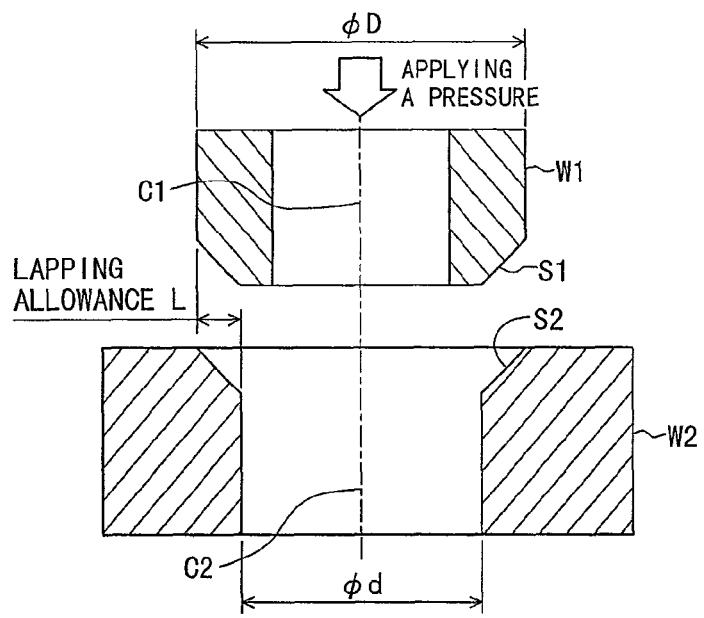
FIG. 4 is a cross-sectional view showing a welded structure of the present invention.
Figure 4:
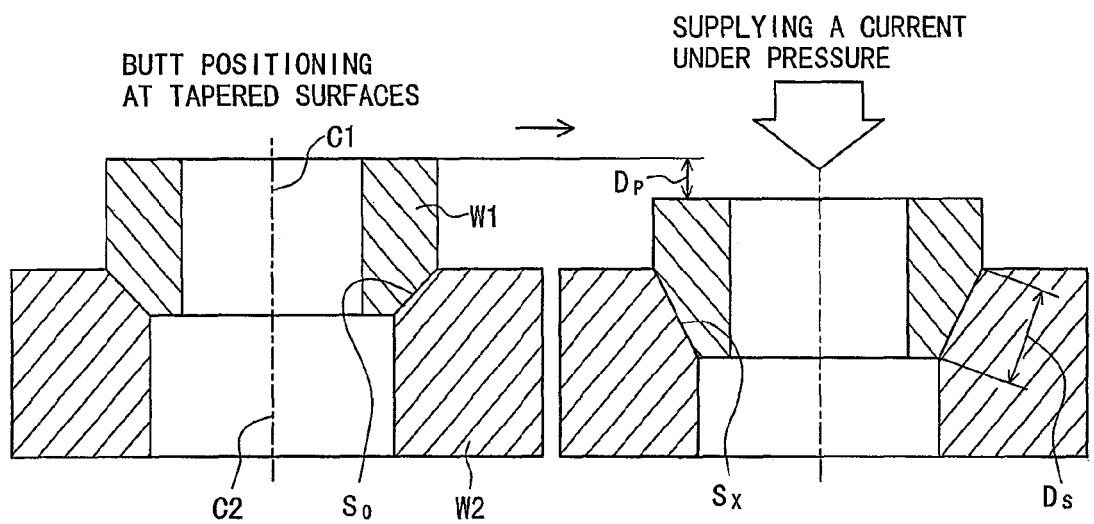

FIG. 4 shows an unjoining state of the metals joined together.

Annular, inclined surfaces S1 and S2 are formed on the two metals joined together. More specifically, the conical convex peripheral surface S1 is formed on the metal D1, and the concave conical surface S2, on the metal D2.

A lapping allowance L is assigned to the metal D1 whose outside diameter ϕD is larger than an outside diameter ϕd of the metal D2, and during welding, the conical surfaces (inclined surfaces) S1 and S2 of both metals are positioned end to end. In other words, both metals are pressed against each other. After this, the convex metal W1, or the material to be welded, is fitted into the concave metal W2 that is the welding material. Under an initial fitting-in state, an inclination of the weld surface is gentle, as denoted by reference symbol "So". After the fitting-in operation, however, the inclination of the weld surface becomes steep, as denoted by reference symbol "Sx". This event is due to the fact that a plastic flow occurs near the welding boundary surface as a result of axial pressure application with both metals softened at the boundary surface by heating due to current.

At this time, since surrounding metals impede deformation in a radial direction, deformation of both metals consequently changes only in a direction of the fitting-in operation, then as denoted by reference symbol Ds, the weld surface spreads in the fitting-in direction, and the inclination of the weld surface becomes steep, which increases the area Ds.

When the two metals to be joined together are pressed against each other at the conical weld surface by applying the pressure, this welding pressure is controlled for its center to match central axes of the two metals existing after being joined. Thus, even if the central axes of both metals are in slight misalignment before welding, central axes C1 and C2 of the conical inclined surfaces of both will automatically match by a centripetal action due to the inclined shape of the conical surfaces.

Analytical results on a cross section of the connection between the joined metals will be described using FIGS. 15A to 15C.

Figure 15:
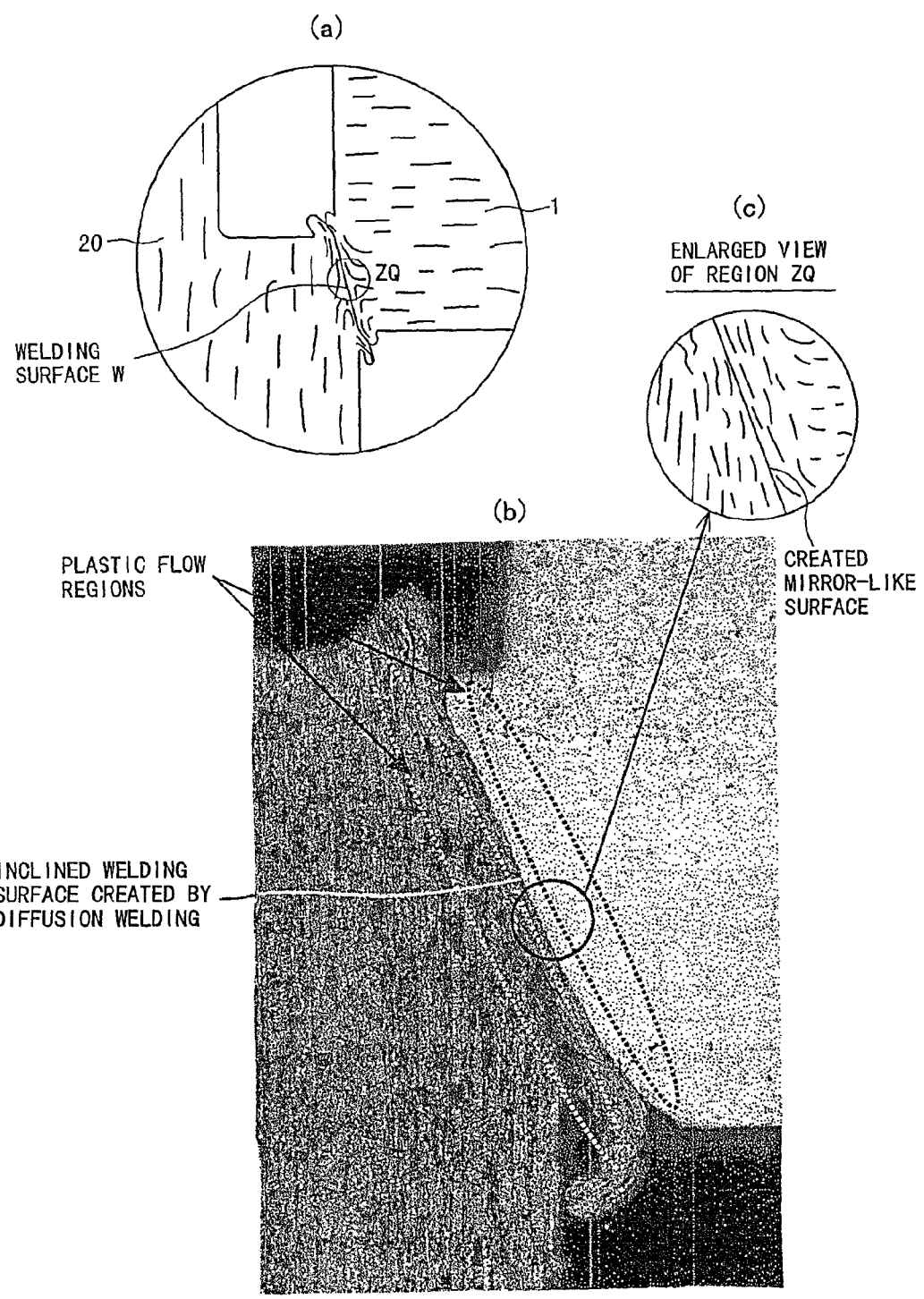
FIGS. 15A, 15B, and 15C are enlarged cross-sectional views showing a welded state of test pieces, FIG. 15B being a microscopic photograph thereof.

FIG. 15B is an enlarged cross-sectional microscopic photograph, showing cross-sectional observation results on a connection between joined test pieces of the pump housing 1 and the installation flange 8 (the test pieces will be described later). The metal extending in a vertical direction in the drawing is the test piece of the pump housing 1, made of a material that was cut into a shape of a round rod so as to comply with Japanese Industrial Standard SUS430. The metal extending in a rightward direction of the drawing is the test piece of the installation flange 8, made of a plate material based on JIS SUS404. The difference in pattern between both materials is due to the difference in composition.

One characteristic of ferrite-based stainless steel (SUS430) is that its grains are coarser than those of austenitic stainless steel (SUS304).

As specified in the relevant JIS regulations, SUS430 and SUS304 differ in hardness: SUS430 is up to 183 in HBW, and SUS304 is up to 187 in HBW.

Plastic flow is obviously ascertained in SUS304, as well as in SUS430.

However, although, partly because of a large amount of chamfering of the SUS304 material at a lower corner thereof, a slight insufficiency in the amount of material pushed out at this lower corner from the weld surface by the plastic flow is emphasized in the drawing, basic differences in fluidity due to the differences in the kind of material (i.e., due to the differences in hardness and in directionality of the material's metallographic structure) are considered to exist between the two materials. If either a shape of a groove for capturing the material pushed out from the weld surface by the plastic flow which has occurred in the conical weld surface of the larger diameter, or a direction of the push-out itself of the material is changed appropriately, this will eventually prevent axial sliding of both metals.

It was confirmed that in these test pieces, fatigue strength required of the installation flange in the high-pressure fuel supply pump will be satisfied if the amount of upsetting (i.e., press-fitting depth of the intended section) is at least 1.5 mm.

It was also confirmed that a lapping allowance L (press-fitting interference) in excess of 0.3 mm results in excessive deformation.

A supply voltage differs according to particular load conditions (the lapping allowance, the amount of upsetting, and the material). However, a voltage ranging from about 160 V to about 300 V is applied to the test pieces.

In addition, it was confirmed that as shown in FIGS. 15A and 15B, the weld surface W basically maintains the conical shape existing before welding was conducted, and that the plastic flow zones of the metals W1 and W2 lie along the weld surface W, at both sides thereof. The occurrence of the plastic flow along the weld surface, not in an alignment direction of the metallographic structure of W2, was further ascertained in the plastic flow zones.

This plastic flow causes the welding metal W1 to brinell into the faying metal W2 so as not to overstep a range of the lapping allowance L, and axially changes a position of W1 according to the particular amount of brinelling. More specifically, since the two metals are press-fitted axially into each other, both slide in with friction at the weld surface, and at the same time, the surfaces of both are crushed and the plastic flow occurs along the weld surface.

As a result, compressive force is stored in a radial direction as much as the weld surface has axially slid in with friction, and the compressive force acts upon the conical, wide weld surface. Thus, large frictional force occurs on the weld surface and acts as axial anti-sliding force.

Furthermore, it was confirmed that mirror-like new surfaces without an impurity zone thereupon are formed between the plastic flow zones. These mirror-like surfaces are formed as impurity-free new base material surfaces after the contact interface between the surfaces of both metals that included an oil membrane, dust, and other substances before welding was conducted has been pushed out from the weld surface by the plastic flow due to the mutual press-fitting of the two metals. At the mirror-like surfaces, both metals form a tight weld surface by diffusion welding of an atomic level, thereby to further constitute a welding connection surface that does not easily cause axial sliding on the weld surface, that is, a large frictional resistance surface due to adhesion. As shown in FIG. 15C that is the enlarged view of region ZQ, in the range of the enlarged optical photograph, the weld surface can be clearly identified and there is no chemical or metallographic or metallurgical fusion or bond occurring. This is probably because there occurs essentially the same situation as the event that overlapping a mirror-like surface upon another mirror-like surface causes adhesion between both surfaces.

The welded structure of the present invention is robust and strong for the above two reasons.

The welded structure of the present invention is further excellent in that the welded connection is free from thermal destruction or damage in terms of metallic composition. That is to say, even under the high temperature, the connection does not exhibit any tendencies to change into another metal alloy or to make the softer metal locally hard.

This demonstrates that the metallic characteristics of both metals, especially, electromagnetic characteristics thereof, do not change at the connection before or after welding, and indicates that this welded structure can be eventually used for a magnetic pathway region.

Furthermore, it was confirmed that compared with laser welding, diffusion welding does not cause significant thermal deformation of the connection before or after welding.

This is due to the advantageous effect that the dimensional changes (the amount of press-fitting, and diameter) existing before and after welding in the welded structure essentially depend only upon the magnitude of the force applied for pressurizing both metals. Conventional laser welding poses the problem that the deformation caused after the weld surface has cooled down makes unpredictable the dimensions of the metals existing after welding was conducted. Thanks to the advantageous effect discussed above, however, such deformation can be suppressed.

In addition, since diffusion welding, compared with conventional laser welding, yields wide conical weld surfaces, these conical weld surfaces have high fluid-sealing reliability over the entire regions from the smaller-diameter inside to the larger-diameter outside, or vice versa. More particularly, a complicated weld surface formed by a layer of fused metal mixture makes formation of a leakage fluid pathway more difficult, having high sealability.

The above advantages are useful in a device having a number of annular connections between metals, as in the high-pressure fuel supply pump described below. This is because the high-pressure fuel supply pump has connections that require the sealing of the fluid according to a state of the section to be welded, or connections between different metals, or a magnetic pathway material or its neighboring connections, or the connections required to have different physical characteristics, and annular connections having a large welding area, and because the welded structure of the present invention can also be applied to any of these connections.

The diffusion-welding method used during implementation of the present invention is one sort of welding in which the metallic materials to be joined together are brought into close contact with each other and then pressurized and heated under a controlled atmosphere such as in a vacuum or an inert gas.

This method can be defined as a welding method that uses the diffusion of metal elements at an atomic level that occurs on the respective weld surfaces. More specifically, this method can be defined as a welding method in which any impurities present on the weld surfaces of the two metals to be joined together are removed by the plastic flow due to heating and pressurizing, whereby new surfaces of impurity-free metals are formed and these new surfaces stick closely to each other for enhanced welding force.

In the relevant Japanese Industrial Standard (JIS), diffusion welding is defined as a welding method in which base materials are brought into close mutual contact, then pressurized under temperature conditions below the melting points of the base materials so as to minimize plastic deformation, and joined together by utilizing the diffusion of atoms that occurs between the connection surfaces of both materials.

For accelerated diffusion-welding connection, a metal whose melting point is lower than that of the base material to be welded can also be interposed at the welding connection interface. This interposed metal is termed an insert metal, and welding is conducted when the insert metal is in either a solid state or a fused state. The former welding method is called "solid-state diffusion welding", and the latter welding method is called "liquid-state diffusion welding" or TLP (transient liquid-phase) diffusion bonding.

Diffusion welding described in this Specification refers to all welding methods outlined above.

In the embodiments and examples described herein, each material to be welded experiences the plastic flow in association with the upsetting direction (press-fitting direction), at the welding interface periphery of the diffusion connection, and a direction of the flow is also fixed (along the weld surface).

At the welding interface itself, however, such a metallographic structure (layer of fused metal mixture) as having a mixture of different kinds of materials welded is not present. Instead, a boundary line of these materials is clearly identifiable at a viewing magnification level of an optical microscope. It is assumed from this fact that at the welding interface itself, the atoms of the elements contained in the materials being welded are diffused into each material and this diffusion consequently generates a diffusion-welded connection not using the insert metal.

The insert metal is used for the acceleration of welding. In the embodiments and examples described herein, however, description is given of a form that uses the adhesion of diffusion welding based on the diffusion of the metal-contained elements (atoms) by the formation of new welding-material and to-be-welded material surfaces at the welding interface due to local upsetting. A form that accelerates welding by metal softening due to local heating is also described.

The implementation of the present invention does not exclude the method in which the insert metal is used.

Basic technical modes of the above embodiments and examples are summarized below.

First Mode of Embodiment

A welded structure of two metals, wherein a welding metal and a metal to be welded are connected together by welding, connection surfaces of both metals include a conical weld surface, and outside the connection surfaces, plastic flow regions of both metals are formed along the connection surfaces.

Second Mode of Embodiment

The welded structure of two metals according to the first mode of embodiment, wherein diffusion weld regions of both metals are formed in a region including the connection surfaces formed outside the plastic flow regions of the metals.

Third Mode of Embodiment

The welded structure of two metals according to the first mode of embodiment, wherein at least either a larger-diameter lateral edge or smaller-diameter lateral edge of each conical weld surface includes an annular blank space, annular groove, or annular recess that looking over the larger-diameter-side or smaller-diameter lateral edge.

Fourth Mode of Embodiment

The welded structure of two metals according to the second mode of embodiment, wherein at least either a larger-diameter lateral edge or smaller-diameter lateral edge of each conical weld surface includes either a blank space, a groove, or a recess, and part of a fused material forming either of the diffusion weld regions is accommodated in the blank space, the groove, or the recess.

Fifth Mode of Embodiment

The welded structure of two metals according to the first mode of embodiment, wherein the welding metal and the metal to be welded has a central axis matching a central axis of each conical weld surface, at least in a zone from a larger-diameter lateral edge of the conical weld surface to a smaller-diameter lateral edge thereof.

Sixth Mode of Embodiment

The welded structure of two metals according to the first mode of embodiment, wherein both metals are formed of a material different from each other in hardness, the weld surface of the harder metal is formed into a convex shape, and the weld surface of the softer metal is formed into a concave shape.

How the welded structure is constructed at various connections in the high-pressure fuel supply pump shown in FIG. 1 will be next described for each of the connections.

1) First, the connection 10w between the intake joint 10 and the pump housing 1 is described below per FIG. 1.

The intake joint 10 has, at a distal end thereof, a tapered weld surface 10M formed of a part of a conical surface.

Welding between the intake joint 10 and the pump housing 1 is achieved using the welding method discussed earlier per FIGS. 3 and 4.

More specifically, the intake joint 10 and the pump housing 1 are joined together by applying a high voltage with both having a connected electrode of different polarity and pressed against each other, that is, when both are in abutting contact with each other under pressure at the connection surface.

The intake joint 10 is constructed so that when this joint is press-fitted into an insertion hole 10H of the pump housing 1 until the distal end of the joint has come into contact with a bottom face of the insertion hole 10H, press-fitting depth, that is, welding length will be determined by the contact.

The bottom face of the insertion hole 10H functions as a restrictor for a direction in which the insertion joint 10 is press-fitted. The welding length is therefore controlled by adjusting a dimension of the insertion hole 10H down to the bottom face thereof. In addition, since increases in welding length correspondingly increase welding strength, the welding length is determined according to the strength required.

According to this welded structure, since the entire contact surface is diffusion-welded, the entire conical weld surface can be sealed against gasoline. In addition, sufficient airtightness is ensured, even without an O-ring or a gasket.

Accordingly, welding strength can be managed on a dimensional basis of parts, so there is an advantage in that the welding strength can be managed easily and with minimum variations.

In addition, as discussed above, the intake joint welded structure of a high-pressure fuel supply pump excellent in airtightness and high in productivity and in reliability can be obtained.

Welding is accomplished by applying a voltage with the intake joint 10 and pump housing 1 pressed against each other.

2) Next, the connection 11w between the discharge joint 11 and the pump housing 1 is described below per FIG. 1.

The discharge joint 11 has, at a distal end thereof, a tapered weld surface 11M formed of a part of a conical surface. The discharge valve mechanism constituted by members such as a discharge valve 6 and a spring 6a for pressing the discharge valve 6 against a valve seat 6b is assembled as a check valve in the discharge joint 11, and this discharge valve mechanism is inserted from an insertion hole 11H of the pump housing 1 so as to rest on a conical, inner peripheral surface.

Welding between the discharge joint 11 and the pump housing 1 is achieved using the welding method discussed earlier per FIGS. 3 and 4.

More specifically, the discharge joint 11 and the pump housing 1 are joined together by applying a high voltage with both having a connected electrode of different polarity and pressed against each other, that is, when both are in abutting contact with each other under pressure at the connection surface.

Axial positioning of the discharge joint 11 will be achieved when a distal end of a member having the valve seat 6b is pressed against a peripheral region of a discharge opening 12D of the pressurizing chamber. The distal end mentioned above faces the pressurizing chamber.

As with that of the intake joint, welding length can be managed on a depth basis of the insertion hole 11H. The discharge joint, however, differs from the intake joint 10 in that the former is designed so that after a peripheral wall of the discharge opening 12D and the distal end of the member having the valve seat 6b have been abutted upon each other, a slight clearance is left between a bottom face of the insertion hole 11H and the distal end of the weld surface 11M, or so that no such clearance is present. However, since airtightness is ensured without an O-ring or a gasket as is similar to the intake joint 10, the discharge valve mechanism as well as the discharge joint becomes simplified in structure.

Here in the pump housing 1, the insertion hole 11H in the discharge joint 11 and the insertion hole 200H in the electromagnetically driven intake valve mechanism 200 are concentrically provided facing each other. If any one of the embodiments or examples heretofore discussed is followed, the electromagnetically driven intake valve mechanism 200 has an outer body surface fixed to the pump housing 1 by laser welding-all-around.

Laser welding is used to weld the entire surfaces of workpieces, so a rotational basis is required for workpiece rotation. If the discharge joint 11, as with a conventional discharge joint, is fixed by laser welding, deformation due to welding heat makes it impossible to use a central axis of the discharge joint 11 as the rotational basis for welding the electromagnetically driven intake valve mechanism 200. Therefore, separate reference machining for welding the electromagnetically driven intake valve mechanism 200 is required in that case.

According to the welded structure of the discharge joint 11 in the present embodiment, since thermal deformation is minimized, the central axis of the discharge joint 11 can be used as the welding basis for the electromagnetically driven intake valve mechanism 200.

Accordingly, the number of sections to be machined is minimizable, so an inexpensive high-pressure fuel supply pump can be provided.

3) Yet another welded structure of the pump housing 1 and cylinder 20 shown in FIG. 1 is described below.

A recess for forming the pressurizing chamber 12 is formed in the pump housing 1, and this recess includes a cylindrical wall 1S that functions as a fitting-in hole for the cylinder 20.

The cylinder 20 is constituted as a tubular body internally having a sliding hole for the piston plunger 2 to slide therein.

The cylindrical wall 1S has a small-diameter cylindrical wall 1S at the pressurizing chamber side, and a small-diameter tubular section 20A of the cylinder 20 is inserted into the small-diameter cylindrical wall 1S. The cylinder 20 includes a large-diameter tubular section 20B following the small-diameter tubular section 20A, and an annular surface is formed between the small-diameter tubular section 20A and the large-diameter tubular section 20B.

An annular surface is also formed between the small-diameter cylindrical wall 1S of the pump housing 1 and a large-diameter cylindrical wall 1SR thereof, and this annular surface of the pump housing 1 and the annular surface of the cylinder 20 are pressed against each other to form an annular sealing surface 20C.

In the present embodiment, the cylinder holder 21 is required for joining the pump housing 1 and the cylinder 20 together.

The cylinder holder 21 is formed into a generally tubular shape, having a center in which a hollow cylinder is formed for the plunger 2 to extend therethrough. An annular recess of a diameter larger than a diameter of the hollow cylinder is formed at a lateral edge of the cylinder 20. An outer edge surface of the tubular section 20B of the cylinder 12, positioned at a side opposite to the pressurizing chamber 12, is press-fitted into the annular recess in order to constitute a sealing surface 21C as a fuel-sealing portion lower than the sealing surface in pressure.

A lateral edge of the cylinder holder 21, provided facing the pressurizing chamber 12, has a convex conical surface, which fits into a concave conical surface formed at a lower-edge inner peripheral portion of the tubular section 20B of the pump housing 1. Thus, the convex conical surface and the concave conical surface combine to form a conical connection surface 21W.

Welding between the pump housing 1 and the cylinder 20 is achieved using the welding method described earlier per FIGS. 3 and 4.

More specifically, the pump housing 1 and the cylinder 20 are joined together by applying a high voltage with both having a connected electrode of different polarity and pressed against each other, that is, when both are in abutting contact with each other under pressure at the connection surface.

The pump is designed so that the pressure for pressing both metals against each other not only generates plastic flow regions at the connection surface 21W, but also generates a press-fitting force required for the sealing surfaces 20C and 21C when axial dimensions of the metals are reduced by the plastic flow of the metals.

The sealing surface 20C consequently functions as a restrictor to restrict a press-fitting depth of both metals (pump housing 1 and cylinder 20), that is, a welding distance therebetween.

The piston plunger 2 has a diameter smaller than that of a region at which a section protruding from the cylinder 20 and inserted into the cylinder holder 21 slidingly fits into the cylinder 20.

An outer surface of the small-diameter section of the piston plunger 2 includes a plunger seal 5 to seal the piston plunger 2 and the cylinder, and to provide sealing against any gasoline leaking in from the sealing surface 21C, and against an inflow of a lubricating oil from the engine room.

The opposite end of the piston plunger 2 with respect to the pressurizing chamber 12 has a fixed lifter 3, and a spring 4 is mounted between the lifter 3 and the cylinder holder 21 so as to surround the piston plunger 2, the plunger seal 5, and a small-diameter tubular section of the cylinder holder 21. The spring 5 has a force always acting upon the piston plunger 2 in the direction in which the piston plunger is pulled out from the pressurizing chamber 12. An O-ring 21D is mounted around a large-diameter tubular section of the cylinder holder 21, formed externally to the spring 4.

The engine block has high-pressure fuel pump installation holes for different positions of the cam 7 which rotates in synchronization with the engine speed, and when the cylinder holder 21 of the high-pressure fuel pump is inserted into any one of the installation holes, the lifter 3 is abutted upon the cam 7. At this time, the O-ring 21D provides sealing between the installation hole in the engine block and the cylinder holder 21.

The high-pressure fuel supply pump is fixed to an installation flange 8, and when the installation flange 8 is fastened to the engine block by means of a screw 9, the high-pressure fuel supply pump is fixed to the engine block.

Because of variations in dimensional tolerances of parts, one of various combinations of the piston plunger 2 and the cylinder 20 is selected so that a clearance between an outside diameter of the piston plunger 2 and an inside diameter of the cylinder 20 will be optimized.

In the present embodiment, the cylinder 20 can be press-fitted into the cylinder holder 21 to fix both temporarily, so the section constituted by the plunger seal 5, lifter 3, and spring 4, including the piston plunger 2 and the cylinder 20, can be assembled in advance. This allows a combination of the piston plunger 2 and the cylinder 20 to be selected only with both mounted, and thus makes it easy to select a combination of the piston plunger 2 and the cylinder 20, and to control assembly processes as well.

With the conventional techniques that involve fixing the cylinder to the pump housing 1 by screwing down the cylinder holder itself to the housing 1, it has not been possible to fix the cylinder and the cylinder holder beforehand. Accordingly, a combination of the piston plunger 2 and the cylinder 20 has not been easily selectable, because the cylinder has been fixed to the pump housing 1 via the cylinder holder prior to inserting the piston plunger from the plunger seal side into the piston plunger sliding hole of the cylinder and conducting the selection.

In addition, since the selection of the above combination has been required, even if the plunger seal was to be assembled into the cylinder holder beforehand, it has not been possible for the diameter of the plunger seal to be reduced below that of the largest diametral section of the piston plunger 2.

Alternatively, to provide the piston plunger 2 with a section smaller than the diameter of the section which slides in the cylinder, it has been structurally necessary to fix the plunger seal between the piston plunger 2 and the cylinder 20 after selecting the combination with respect thereto. This has made it difficult to accurately set up concentricity between the piston plunger, the plunger seal, and the cylinder holder.

The above problems are swept away in the present embodiment.

Furthermore, according to the welded structure of the present embodiment, when the cylinder holder 21 is welded into the cylinder insertion hole 1SR of the pump housing 1, since an axial center of the pump housing 1 and that of the cylinder insertion hole 1SR match automatically, if an axial center of the cylinder 20 and that of the cylinder holder 21 match, the central axes of the cylinder 20, pump housing 1, and cylinder insertion hole 1SR also agree automatically.

Furthermore, as described above, double airtightness against outside is ensured at the sealing surface 20C as well as at the connection 21w. Leakage from the sealing surface 21C is further shut off by sealing with the plunger seal 5. The leakage fuel route is thus triple-sealed.

Hence, according to the present embodiment, a high-pressure fuel supply pump can be provided that is easy to manage in terms of assembly, excellent in airtightness, and high in productivity and in reliability.

Figure 10A:
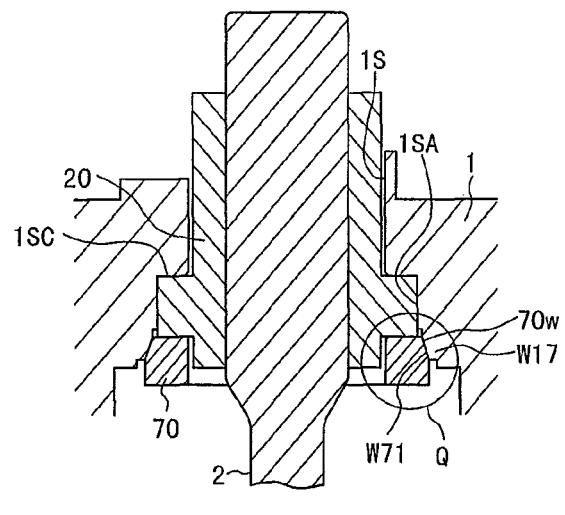
FIGS. 10A, 10B, and 10C are longitudinal cross-sectional views of a high-pressure fuel supply pump according to a further embodiment of the present invention, with FIG. 10A showing the pump itself, FIG. 10B showing section Q of the pump in enlarged view, and FIG. 10C showing a view similar to FIG. 6 of the entire pump.
Figure 10B:
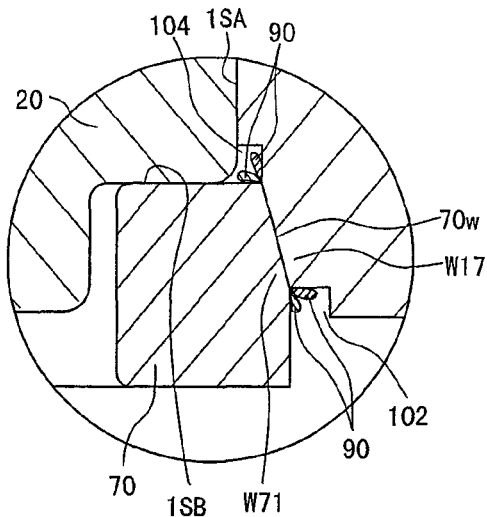
Figure 10C:
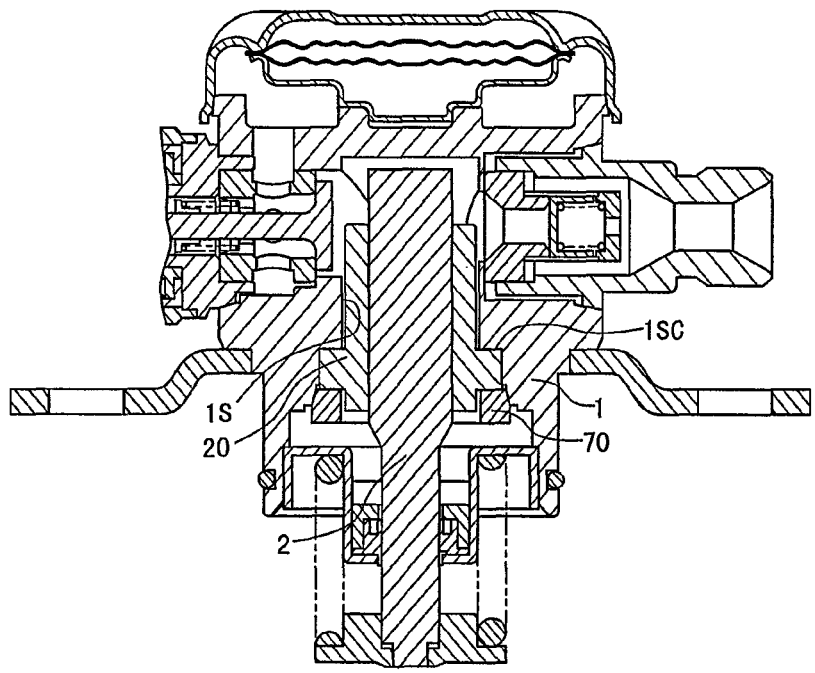

FIGS. 10A, 10B, and 10C are detailed cross-sectional views showing still another embodiment of a connection between the pump housing 1 and the cylinder 20.

The cylinder 20 is sandwiched between the pump housing 1 and a fixing ring 70. The fixing ring 70 has an outer surface welded into the pump housing. The connection 70w functions as the welded structure of the present invention. The pump housing 1 includes a groove 104 and a stepped portion 102, both of which form a storage portion for an overflow piece 90. FIGS. 10A to 10C differ from FIG. 7 in that the fixing ring 70 is used to hold the cylinder 20 in a sandwiched condition. When, as in FIG. 7, the cylinder 20 is connected directly to the pump housing 1 by welding, since the inclined surfaces of both metals are pressurized, a vector component directed perpendicularly to the pressurizing direction occurs, thus the outer surface of the cylinder 20 is compressed, and an inner surface to function as a sliding surface of the piston plunger 2 undergoes a force in the direction in which the inner surface becomes smaller. As a result, particular strength of the cylinder 20 may render it difficult to maintain the required clearance between the piston plunger 2 and the cylinder 2. For this reason, the cylinder 20 is not connected directly to the pump housing 1 by welding. Instead, as shown in FIGS. 10A to 10C, the fixing ring 70 is used to hold the cylinder 20 in sandwiched form, and welded into the pump housing 1. Thus, only the force in the pressurizing direction acts upon the cylinder 20, and no clearance is liable to occur.

Further details are described below.

As shown in FIG. 10A, the small-diameter section of the cylinder 20 is inserted into the hole 1S of the pump housing 1, and then an outer peripheral surface of a large-diameter section of the cylinder 20 is press-fitted into a large-diameter hole 1SA of the pump housing 1, whereby both are fixed temporarily. At this time, a stepped axial edge of the large-diameter section of the cylinder 20 becomes abutted upon a stepped surface of the pump housing 1 to form an abutting surface 1SC.

The fixing ring 70 abuts upon a surface opposite to an abutting surface 1SB at the stepped axial edge of the large-diameter section of the cylinder 20. At an inner peripheral tubular surface of the pump housing 1, the fixing ring 70 is welded to obtain the welded structure described per FIGS. 3, 4.

A press-fitting force at the abutting surfaces 1SB, 1SC is controlled by adjusting the upsetting depth during welding connection. This press-fitting force is controlled to a value required for sealing between the pressurizing chamber and the atmosphere.

Sealing between the pressurizing chamber and the atmosphere is also conducted at the diffusion connection formed between the fixed ring 70 and the inclined connection surface 70W of the pump housing 1. The groove in the pump housing 1 forms a blank space 104 at a small-diameter edge of the connection surface 70W, and the overflow pieces as the plastic flow materials during welding are captured into this blank space. In the event of fuel leakage from the abutting surface 1SC, the blank space 104 also captures the leaking fuel into the blank space 104 to prevent this fuel from flowing out from the pump housing.

Figure 3:
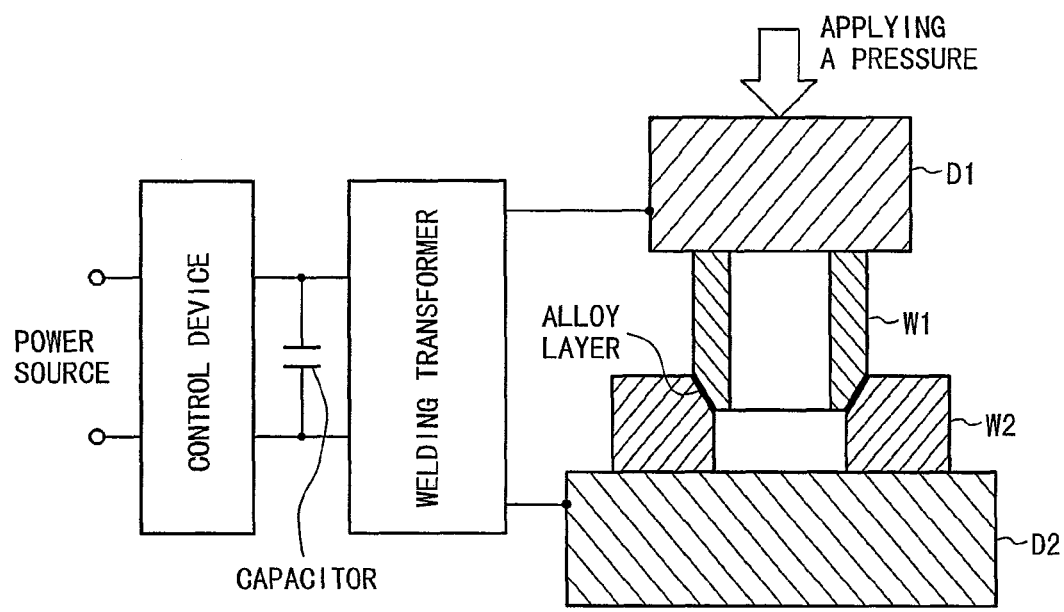
FIG. 3 is a process diagram showing a welding method of the present invention.
Figure 6:
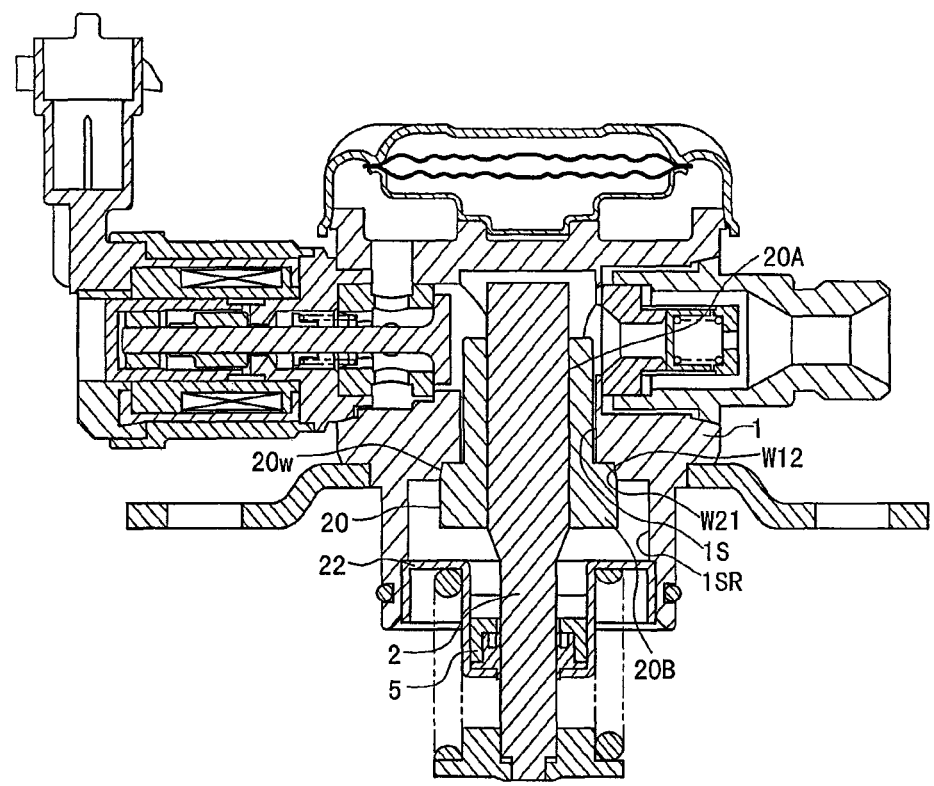
FIG. 6 is a longitudinal cross-sectional view of an entire high-pressure fuel supply pump according to yet another embodiment of the present invention.
Figure 11A:
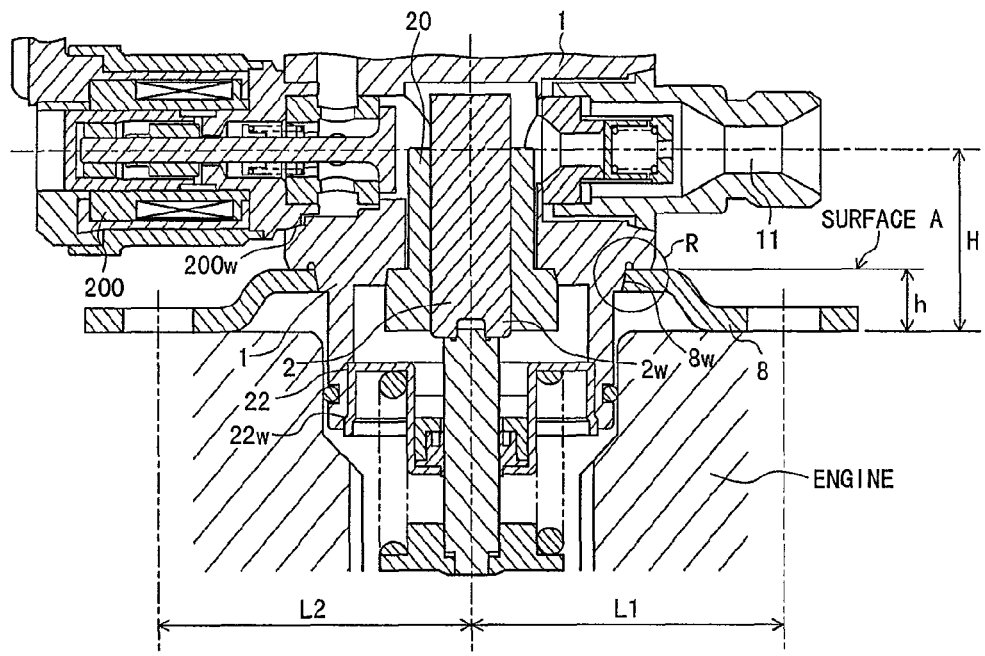
FIGS. 11A and 11B are longitudinal cross-sectional views of a high-pressure fuel supply pump according to a further embodiment of the present invention, FIG. 11A showing the pump itself, and FIG. 11B showing section R of the pump in enlarged view.
Figure 11B:
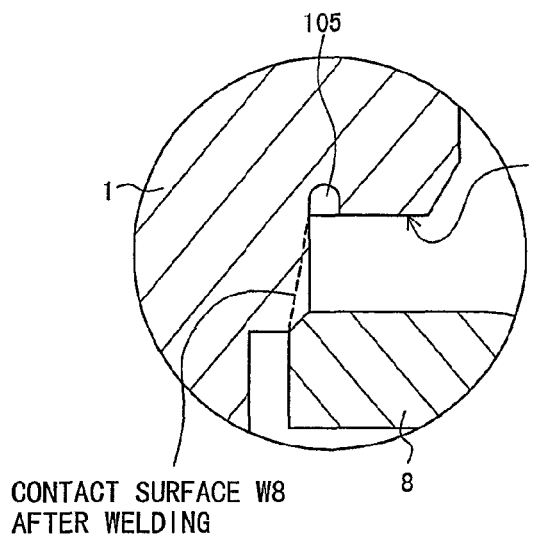
Figure 11B:
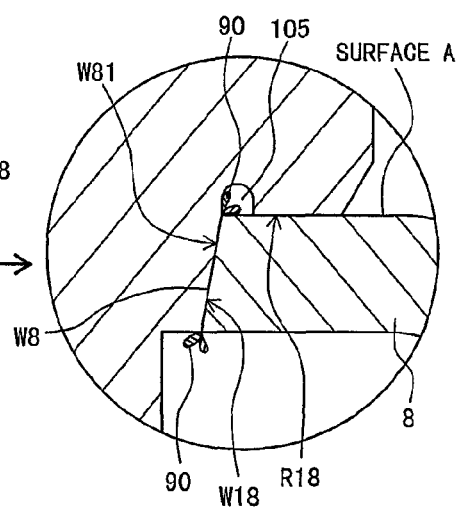

In the present embodiment, as in the embodiments of FIGS. 6 and 11, the plunger seal is stored into a plunger seal holder, and then in the welded structure described per FIGS. 3 and 4, the seal is connected by welding to the inner peripheral portion of the large-diameter hole following the cylinder fitting-in hole of the pump housing 1. Thus, sealing between the pressurizing chamber and the atmosphere is provided at the connection. The plunger seal holder is also used to hold the spring of the lifter.

4) Next, the welded structure between the damper cover 40 and the pump housing 1 will be described per FIGS. 1 and 2.

The damper chamber DS is formed by welding a lower end of a tubular sidewall of the damper cover 40 onto a peripheral section of an annular recess formed in an upper outer wall of the pump housing 1.

The damper chamber DS has a dish-like resilient damper holder 30 rested on an upper wall of the pump housing 1, and a metallic two-piece diaphragm damper 80 rested at an upper edge of the damper holder 30.

The metallic two-piece diaphragm damper 80 includes one pair of (upper and lower) metallic diaphragms 80A and 80B. The metallic diaphragms 80A and 80B each have a peripheral region welded over its entire surface, at a position 80C, and a space 80S formed between both diaphragms is filled with an inert gas such as argon, and is constructed to be expandable according to a particular change in ambient pressure.

At a pathway 80P formed between an outer edge of the metallic two-piece diaphragm damper 80 and the damper cover 40, a fuel pathway 80U interposed between the metallic diaphragm 80A and the damper cover 40 is connected to the damper chamber 10b that also serves as a fuel pathway. Additionally, a fuel pathway 80D interposed between the metallic diaphragm 80A and the damper holder 30 is connected to the damper chamber 10b, at a hole 30H provided in the damper holder 30.

The damper cover 40 has a plurality of inside protrusions 40A co-circumferentially on its upper face, with the inside protrusions 40A each abutting an upper annular edge of the metallic two-piece diaphragm damper 80 internally to the weld 80C thereof.

The damper holder 30, on the other hand, abuts at its upper edge upon a lower annular edge of the metallic two-piece diaphragm damper 80 internally to the weld 80C thereof.

In this way, the metallic two-piece diaphragm damper 80 is sandwiched between the upper and lower annular edges. The connection 40w is formed with a convex conical weld surface at an outer edge of the pump housing 1, and a concave conical weld surface that matches the convex conical weld surface is formed at a lower inner surface of the damper cover 40.

Welding between the pump housing 1 and the damper cover 40 is achieved using the welding method described earlier per FIGS. 3 and 4.

More specifically, the pump housing 1 and the damper cover 40 are joined together by applying a high voltage with both having a connected electrode of different polarity and pressed against each other, that is, when both are in abutting contact with each other under pressure.

The force that presses the pump housing 1 against the damper cover 40 becomes a force that presses the upper annular edge of the metallic two-piece diaphragm damper 80, at each inside protrusion 40A. The pump is designed so that this force is strong enough to hold the annular edges of the metallic two-piece diaphragm damper 80 in sandwiched form from a vertical direction, between the inside protrusion 40A and the upper edge of the damper holder 30, even after the damper cover 40 has been connected to the damper cover 40 by welding.

According to the present embodiment, since diffusion welding is conducted in an electrically energized condition during the pressurization of the damper cover 40, the sandwiched-holding force for the metallic two-piece diaphragm damper 80 can be sufficiently maintained and airtightness also achieved.

In the conventional laser-welding techniques, depending upon the direction of the thermal deformation after welding, release of the distortion has been likely to weaken the force that holds the annular edges of the metallic two-piece diaphragm damper 80 in sandwiched form from the vertical direction. After welding, therefore, deformation mode analysis with joint shapes has been required. These problems, however, are swept away in the welded structure of the present embodiment.

For these reasons, reduction in damper-mechanism design workload and the stability of the sandwiched-damper holding force are ensured and a high-pressure fuel supply pump excellent in airtightness and high in productivity and in reliability can be provided.

Figure 12:
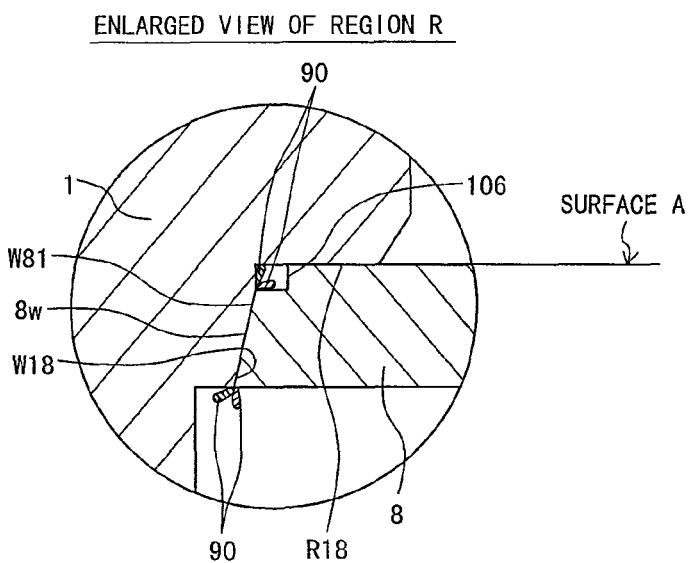
FIG. 12 is an enlarged longitudinal cross-sectional view showing an example of section R of the high-pressure fuel supply pump of FIG. 11.

5) Next, the welded structure of the connection 8W between the pump housing 1 and the installation flange 8 will be described per FIGS. 11A and 11B. Another embodiment of the same connection is shown in FIG. 12.

FIGS. 11A, 11B are detailed cross-sectional views of the flange connection.

The installation flange 8 is connected to the pump housing 1 by welding. The connection 8w forms the welded structure of the present invention. The installation flange 8 is required to satisfy dimensional accuracy of height H of the intake and discharge joints installed in the pump housing 1, and screw hole pitches L1 and L2, with respect to an installation surface of the engine. Surface A is used as a basis for dimensional management of each joint installation hole in the pump housing 1. Meanwhile, dimension "h" is used for independent management of the flange, and dimensional management of height H can be facilitated by using surface A as a stopper for the installation flange during welding. The mounting screw hole pitches L1, L2 with respect to the pump housing 1 are managed for the flange alone. According to the present embodiment, since the connection is an inclined abutting surface, pressurization allows automatic matching between the central axis of the pump mounting 1 and that of the installation flange 8 by a centripetal action, and hence, easy management of the screw hole pitches L1, L2 with respect to the pump housing 1.

The pump housing 1 has a groove 105. The overflow pieces 90 that have protruded from the weld surface during the welding of the installation flange 8 are stored into the groove 105, so the protruding overflow pieces do not become caught on the stopper surface (surface) A. Height dimension H can therefore be stabilized without variations.

FIG. 12 shows an enlarged cross-sectional view of the flange connection.

FIG. 12 differs from the enlarged views of FIGS. 11A and 11B in that a storage portion for the material 90 which has protruded from the weld surface is formed as a stepped portion 106 formed on the surface of the flange. The installation flange is press-molded for reducing costs. If there are margins on welding strength, reducing the area of the connection 8w, that is, the upsetting depth (the welding length in a plate-thickness direction), and press-molding the stepped portion 106 of the flange will make unnecessary, and disuse, the grooving of the pump housing. This, in turn, will reduce machining costs of the pump housing 1. In addition, similar to the example described above, the overflow pieces 90 that have protruded from the weld surface are stored into the stepped portion 106 and do not become caught on the stopper surface (surface) A. Height dimension H can therefore be stabilized without variations.

Further details will be described hereunder.

The embodiment in FIGS. 11A, 11B is basically the same as that of FIG. 1 in configuration, except that: the piston plunger 2 has its large-diameter and small-diameter sections machined separately and then integrated by welding; as will be detailed later, the cylinder 20 is connected directly to the pump housing 1 by welding; as will be detailed later, the electromagnetically driven intake valve mechanism 200 is fixed to the pump housing 1 in the welded structure of the present invention; and as will be detailed later, the plunger seal holder 22 is fixed to the pump housing 1 in the welded structure of the present invention.

The pump housing 1 has a conical outer wall W18 on its outer surface, and a central section of the installation flange 8 includes an annular hole through which the pump housing 1 is inserted. An inner surface of the annular hole in the installation flange 8 includes an inverted conical surface W81 that matches the conical outer wall W18 of the pump housing 1.

Welding between the pump housing 1 and the installation flange 8 is achieved using the welding method described earlier per FIGS. 3 and 4.

More specifically, the pump housing 1 and the installation flange 8 are joined together by applying a high voltage with both having a connected electrode of different polarity and pressed against each other, that is, when both are in abutting contact with each other under pressure.

The installation flange 8 is press-fitted until it has abutted a restriction surface R18 formed in the pump housing 1, and this press-fitting depth becomes a welding size that determines welding strength.

In the present embodiment, a large-diameter lateral edge of the conical outer wall W18 includes an annular blank space 105 having a wide exterior. The annular blank space 105 captures the overflow pieces 90 of both metals, pushed out from an edge of the conical connection surface 8W by plastic flow. The annular blank space 105 can be formed as either an annular groove formed on the inner surface of the restriction surface R18 of the pump housing 1 by machine cutting, or a recess formed by press-molding. Depth of the annular blank space 105 from a position of the restriction surface R18, or width of the blank space 105 is determined by the welding distance or a composition of the material.

The connection surface 8W is opened at its small-diameter lateral edge to the atmosphere. If the overflow pieces 90 of both metals are pushed out from this edge by plastic flow, therefore, the overflow pieces 90 do not need to be captured at the groove or the recess. The corresponding section can be cut off if it obstructs pump installation on the engine block.

As shown in FIG. 11B, after welding, the inclination of the connection surface 8W between the inner surface W81 of the installation flange 8 and the outer surface W18 of the pump housing 1 is greater than before welding.

This is because, since both metals are pressurized in a heated state during welding, the connection surface and periphery become soft and the metals are press-fitted while plastically flowing along the connection surface. The plastic flow cannot spread in a radial direction since the to-be-welded metal surrounding the connection surface exists as a barrier, so the plastic flow occurs in an axial direction (press-fitting direction) that a radius of the flow decreases. This makes the inclination of the connection surface steep, thus correspondingly increasing the connection area, causing a radially outward stress or inward fastening force, and resulting in a strong connection region.

As shown in FIG. 12, an annular blank space 106 having a wide exterior is formed at the large-diameter lateral edge of the conical outer wall W18 of the installation flange 8. Depth of the annular blank space 106 is determined by geometries of the large-diameter lateral edge of the connection surface 8W and the restriction surface R18.

For this connection, reference is made to the analytical results on test pieces, shown in FIGS. 15A and 15B.

The high-pressure fuel pump is screwed down and fixed to the engine via the installation flange 8 connected to the pump housing 1 by welding. The reaction force of the in-cylinder pressure developed during the compression stroke of the piston plunger 2, the compressive repulsion of the spring 4, and the external force due to the overall pump weight including the as-filled fuel weight of the pump are exerted upon the installation flange 8.

It is important, therefore, to ensure sufficient strength not only of the installation flange 8 itself, but also of the connection to the pump housing 1.

In the conventional laser-welding techniques, even if the thickness of the flange is increased in an attempt to obtain strength, since the connection has limits on depth of penetration, a capacity, load, or operating environment of the high-pressure fuel pump may not allow sufficient flange strength to be ensured for actual pump usage.

According to the present invention, since an increase in the thickness of the flange correspondingly increases the press-fitting depth (i.e., the welding length), there is an advantage in that the strength of the connection can be increased according to the particular thickness of the flange.

The installation flange 8 is made of a press-molded plate material for reduced costs. When the flange is installed in the engine, planarity of the installation surface must be controlled below a predetermined deformation level. General fillet welding or laser welding, however, is likely to deteriorate planarity because of significant thermal deformation due to high welding heat input. Press-molded and other thin plate materials, for example, are affected by the deterioration very significantly. In the present embodiment, low heat input to the connection minimizes the amount of plane deformation, thus allowing the planarity of the installation flange 8 to be easily achieved.

As with the above planarity, the positions of the screw-mounting holes require stringent accuracy. In the present embodiment, the accuracy of the mounting hole positions with respect to the pump housing 1 is easy to ensure, since the central axis of the pump housing 1 automatically agrees with a welding reference position of the flange if accurate screw hole positioning based on central axes of the mounting holes in the pump housing 1 is conducted with the flange properly mounted alone.

In this way, a high-pressure fuel supply pump can be provided that makes the strength of the connection easily achievable by adjusting the press-fitting depth and is high in mounting-dimensional accuracy and hence in quality and reliability.

6) The welded structure of the connection between the pump housing 1 and the housing of the relief valve mechanism 15 will be described per FIG. 5.

The relief valve mechanism 15 includes the tubular housing 15A having a ball valve 15B accommodated therein. A fuel pathway 15P formed with a tapered valve seat 15C is provided at an internal end of the tubular housing 15A. The ball valve 15B is retained between the valve seat 15C and a ball holder 15H. Also, an end of a spring 15D abuts upon a face of the ball holder 15H, formed at a side opposite to the ball valve 15B. The spring 15D abuts at the other end upon a metallic retainer 15F, which is fixed by press-fitting to an inner edge surface of the tubular housing 15A, formed at a side opposite to the valve seat 15C. In the thus-constructed relief valve mechanism 15, the ball valve 15B is usually pressed against the valve seat 15C by the spring 15D in order to block the fuel pathway 15P.

When the fuel pressure at a downstream side of the discharge valve, that is, the high-pressure fuel pressure at the fuel pathway 15P in the relief valve mechanism 15 reaches or exceeds a required level, the pressure of the fuel causes the ball valve 15B to compress the spring 15D, leave the valve seat 15C, and open the fuel pathway 15P. Centrally in the retainer 15F is formed a communicating hole 15S, which releases the pressure to an upstream low-pressure side of the discharge valve 6 (i.e., to the pressurizing chamber, the low-pressure pathway that the intake pathway forms, or the damper chamber), thereby to prevent damage to the pump or the high-pressure pipeline.

Figure 5:
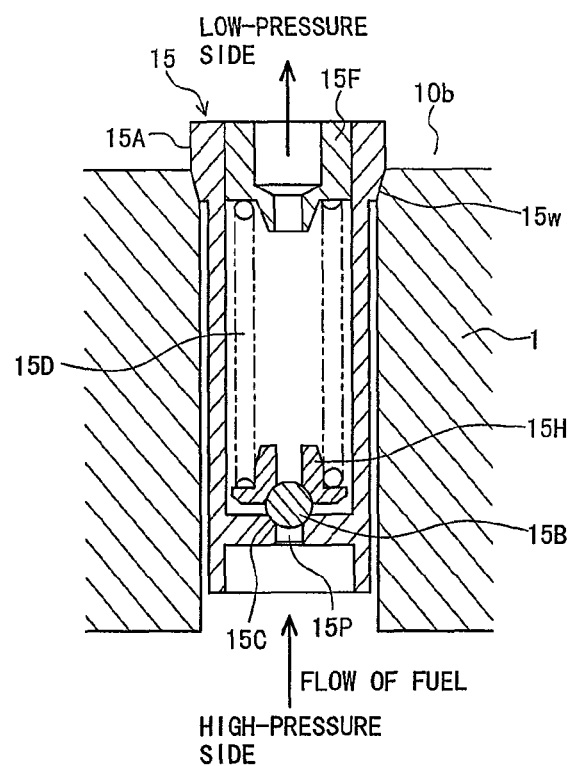
FIG. 5 is a longitudinal cross-sectional view showing a welded structure of a relief valve in another embodiment of the present invention.

As shown in FIG. 5, the relief valve mechanism 15 is welded with the relief valve housing 15A inserted in a mounting hole of the pump housing 1 after, under a sub-assembly state, mounting length of the spring 15D has been adjusted and an opening pressure of the valve has been set.

Welding between the relief valve housing 15A and the pump housing 1 is achieved using the welding method described earlier per FIGS. 3 and 4.

More specifically, the relief valve housing 15A and the pump housing 1 are joined together by applying a high voltage with both having a connected electrode of different polarity and pressed against each other, that is, when both are in abutting contact with each other under pressure.

The relief valve 15 has a differential pressure of several tens of MPa applied thereto, and undergoes a force by which the valve is pushed out to the low-pressure side, so since only press-fitting does not provide sufficient welding strength, a preventing mechanism against sliding-out is required.

In the welded structure of the present embodiment, a preventing mechanism against sliding-out can be disused since a diffusion weld is formed on the connection surface 15W, since a wide welding area formed on conical surfaces is obtainable within the same axial dimensions, and thus since sufficient welding strength can be achieved.

In addition, since the connection surface 15W offers a sufficient sealing effect, a sealing element such as an O-ring or gasket is unnecessary.

Accordingly, a structurally simplifiable, highly design-flexible, and inexpensive high-pressure fuel pump can be provided.

7) Next, three embodiments of welding the cylinder 20 directly to the pump housing 1 will be described per FIGS. 6 to 9.

The seal holder 22 has a mounted plunger seal 5 for sealing a peripheral surface of the piston plunger 2, and the peripheral surface is press-fitted into the pump housing and welded to maintain airtightness. The connection 20w on the cylinder 20 is welded in the welded structure shown in FIGS. 3 and 4.

Since the cylinder 20 receives the in-cylinder pressure developed in the pressurizing chamber 12, the cylinder needs to be pressed against the seat surface of the pump housing 1, with a force opposed to the in-cylinder pressure. In the welded structure of the present invention, the cylinder 20 can be directly welded to the pump housing 1, sufficient welding strength against the in-cylinder pressure can be obtained, and airtightness between the cylinder and the pressurizing chamber can also be achieved. Hence, cavitation can be prevented without fuel leakage from the interface between the pump housing 1 and the cylinder 20, and the connection (sealed region) is kept free from erosion and corrosion.

In addition, the central axis of the cylinder 20 can be automatically matched to that of the cylinder insertion hole in the pump housing 1 by a centripetal action.

For these reasons, a high-pressure fuel pump can be provided that is easily achievable in terms of the strength of a welded connection, high in dimensional accuracy, and excellent in quality and in reliability.

Figure 7:
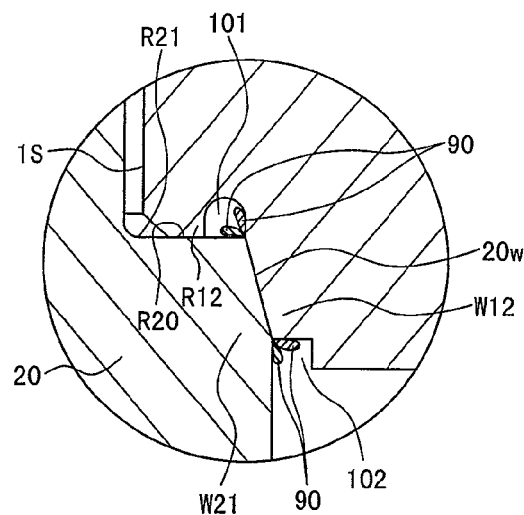
FIG. 7 is an enlarged longitudinal cross-sectional view of section P in the high-pressure fuel supply pump of FIG. 6.

FIG. 7 shows a detailed cross-sectional view of the cylinder connection.

The cylinder 20 is directly connected to the pump housing 1 by welding. The connection 20w is welded in the welded structure shown in FIGS. 3, 4. In the welded structure of the present embodiment, since the connection includes a large lapping allowance because of the cylinder 20 having an outside diameter greater than an inside diameter of the cylinder insertion hole in the pump housing 1, residues of the joined materials are pushed out from the edge of the connection surface by plastic flow and are formed as annular overflow pieces 90 at both sides of the connection surface. In the pump housing 1, an annular blank space is formed by the groove 101 and the stepped portion 102 or an annular recess, thereby to form the storage portion for the overflow pieces 90.

This storage portion, although formed at a connection on the cylinder by way of example, is applicable to other weldable regions as well.

Figure 8:
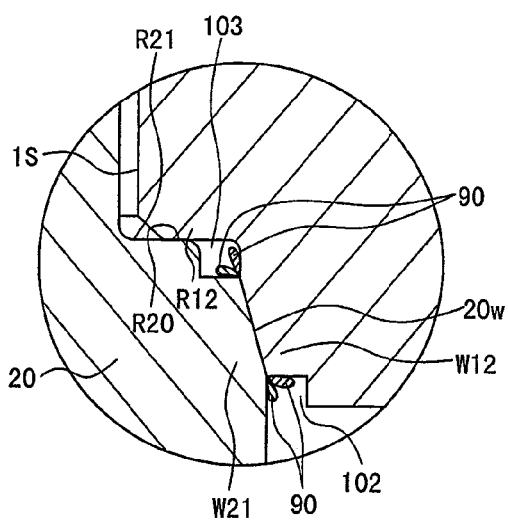
FIG. 8 is an enlarged longitudinal cross-sectional view of section P in a high-pressure fuel supply pump different from that of FIG. 7.

FIG. 8 shows another detailed cross-sectional view of the cylinder connection.

The cylinder 20 is directly connected to the pump housing 1 by welding. The connection 20w is welded in the welded structure shown in FIGS. 3, 4. This connection differs from that of FIG. 7 in that the storage portion for the overflow pieces 90 is formed as a stepped portion 103 on the cylinder 20. In this way, providing a blank space in the form of a grooved or stepped portion in either of the two metals joined together allows the formation of a storage portion for the overflow pieces 90.

FIG. 8 shows yet another detailed cross-sectional view of the cylinder connection.

Figure 9:
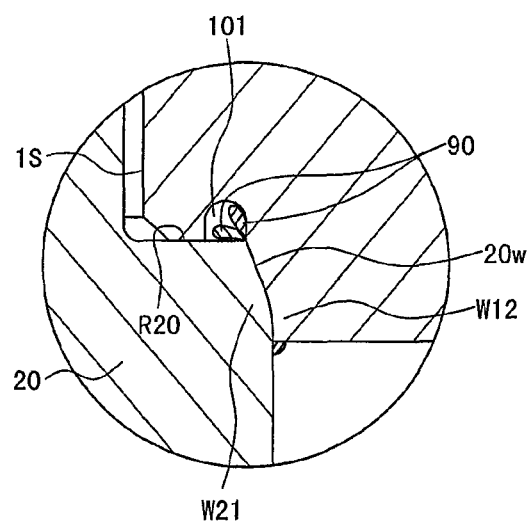
FIG. 9 is an enlarged longitudinal cross-sectional view of section P in a high-pressure fuel supply pump different from that of FIG. 6 or 7.

The cylinder 20 is directly connected to the pump housing 1 by welding. The connection 20w is welded in the welded structure shown in FIGS. 3, 4. This connection differs from that of FIG. 7 in that a difference in hardness is provided between the two metals to be joined together. For example, if the cylinder 20 is harder than the pump housing 1, the connection surface has a convex shape with the cylinder side bent as shown in FIG. 9. At this time, the overflow pieces 90 protruding from the connection surface concentrate at one side, so one storage portions (blank space such as a groove or stepped portion) can be disused.

Further details are described below.

In the welded structure of the cylinder 20 and pump housing 1 described using the embodiment shown in FIG. 1, the cylinder 20 is fixed by press-fitting to the pump housing 1 via the cylinder holder 21 welded thereto. In the welded structure illustrated and described using the present embodiment, on the other hand, the cylinder 20 is directly welded to the pump housing 1 without using the cylinder holder.

As in FIG. 1, the pump housing 1 includes a recess to form the pressurizing chamber 12, and this recess has a cylindrical wall 1S into which the cylinder 20 fits.

The cylindrical wall 1S has a small-diameter cylindrical wall 1S at the pressurizing chamber side, and a small-diameter tubular section 20A of the cylinder 20 is inserted into the small-diameter cylindrical wall 1S. The cylinder 20 includes a large-diameter tubular section 20B following the small-diameter tubular section 20A, and an annular surface R12 is formed between the small-diameter tubular section 20A and the large-diameter tubular section 20B.

A second annular surface R12 is formed between the small-diameter cylindrical wall 1S of the pump housing 1 and a large-diameter cylindrical wall 1SR thereof.

That distal edge of the large-diameter tubular section 20B which faces the pressurizing chamber 12 is machined to form a convex conical surface W21, which fits into a concave conical surface formed at a lower-edge inner peripheral portion of the tubular section 1SR of the pump housing 1. Thus, the convex conical surface and the concave conical surface combine to form a conical connection surface 21w.

Welding between the pump housing 1 and the cylinder 20 is achieved using the welding method described earlier per FIGS. 3 and 4.

More specifically, the pump housing 1 and the cylinder 20 are joined together by applying a high voltage with both having a connected electrode of different polarity and pressed against each other, that is, when both are in abutting contact with each other under pressure at the connection surface.

The pump is designed so that the pressure for pressing both metals against each other not only generates plastic flow regions at the connection surface 21W, but also generates a press-fitting force required for the sealing surfaces 20C and 21C when axial dimensions of the metals are reduced by the plastic flow of the metals.

The annular surface R12 of the pump housing 1 and the annular surface R21 of the cylinder 20 are brought into abutting contact with each other to form an annular sealing surface R20 that is a first sealing surface. The annular sealing surface R20 will be described later.

The sealing surface 20C consequently functions as a restrictor to restrict a press-fitting depth of both metals (pump housing 1 and cylinder 20), that is, a welding distance therebetween.

The piston plunger 2 has a diameter smaller than that of a region at which a section protruding from the cylinder 20 and inserted into the cylinder holder 21 slidingly fits into the cylinder 20.

An outer surface of the small-diameter section of the piston plunger 2 includes a plunger seal 5 to seal the piston plunger 2 and the cylinder, and to provide sealing against any gasoline leaking in from the sealing surface 21C, and against an inflow of a lubricating oil from the engine room.

The opposite end of the piston plunger 2 with respect to the pressurizing chamber 12 has a fixed lifter 3, and a spring 4 is mounted between the lifter 3 and the cylinder holder 21 so as to surround the piston plunger 2, the plunger seal 5, and a small-diameter tubular section of the cylinder holder 21. The spring 5 has a force always acting upon the piston plunger 2 in the direction in which the piston plunger is pulled out from the pressurizing chamber 12. An O-ring 21D is mounted around a large-diameter tubular section of the cylinder holder 21, formed externally to the spring 4.

The engine block has high-pressure fuel pump installation holes for different positions of the cam 7 which rotates in synchronization with the engine speed, and when the cylinder holder 21 of the high-pressure fuel pump is inserted into any one of the installation holes, the lifter 3 is abutted upon the cam 7. At this time, the O-ring 21D provides sealing between the installation hole in the engine block and the cylinder holder 21.

The high-pressure fuel supply pump is fixed to an installation flange 8, and when the installation flange 8 is fastened to the engine block by means of a screw 9, the high-pressure fuel supply pump is fixed to the engine block.

8) A connection 200w between the electromagnetically driven intake valve mechanism 200 and the pump housing 1 will be described in detail per FIGS. 13, 14, and 16.

A housing 205 that forms part of an outer shell of the electromagnetically driven intake valve mechanism 200 provided at an entrance of the pressurizing chamber in the pump housing 1 also constitutes part of a magnetic pathway of the electromagnetically driven intake valve mechanism 200.

The housing 205 has a peripheral tubular section 206 fixedly fitted into a hole 200H of the pump housing 1.

The connection 200W inclined to a central axis of the housing 205 is formed at the above fitting-in section between the outer shell of the housing 205 of the electromagnetically driven intake valve mechanism 200 and the pump housing 1.

A sealing portion between a fuel pathway 10a in which the electromagnetically driven intake valve mechanism 200 is installed, and the atmosphere, is formed at the inclined connection surface 200W by the diffusion weld region of both metals, that is, the housing 205 and pump housing 1 that do not suffer melting or fusion due to heat.

Around an intake entrance of the pressurizing chamber formed in the pump housing 1, an abutting portion M upon which the distal end of the electromagnetically driven intake valve mechanism 200 abuts is provided as a restrictor to restrict any axial relative displacements of the housing 205 and the pump housing 1, caused by plastic flow during welding. The abutting portion M functions as a sealing surface to conduct sealing between the pressurizing chamber 12 and the fuel pathway 10a located upstream with respect to the intake valve 203.

The electromagnetically driven intake valve mechanism 200 is inserted from the outside of the pump housing 1 into the hole 200H thereof, then after the peripheral tubular section 206 of the housing 205 of the intake valve mechanism 200 has been abutted upon an entrance inner surface of the hole 200H, current is supplied to the abutting section 200W of the pump housing 1 and the housing 205 of the intake valve mechanism 200 by applying a voltage to both housings, and both are pressed against each other while the abutting section 200W is being heated with the current.

Consequently, a plastic flow not causing melting or fusion due to heat occurs along the abutting section 200W. The diffusion weld region of both metals (the pump housing 1 and the housing 205 of the intake valve mechanism), inclined to an axial line of the hole 200H in the pump housing 1, is then formed at the abutting section 200W by the plastic flow and the relative pressurization. Thus, plastic flow regions of the metals are formed along the diffusion weld region, at both sides thereof.

The abutting portion M upon which the distal end of the electromagnetically driven intake valve mechanism 200 abuts is provided around the intake entrance 12A of the pressurizing chamber 12. The electromagnetically driven intake valve mechanism 200 is inserted from the outside of the pump housing 1 into the hole 200H thereof, then after the peripheral tubular section of the housing 205 of the intake valve mechanism has been abutted upon the entrance inner surface of the hole 200H, current is supplied to the abutting section M of the pump housing 1 and the housing 205 of the intake valve mechanism 200 by applying a voltage to both housings, and both are pressed against each other while the abutting section 200W is being heated with the current.

Consequently, a plastic flow not causing melting or fusion due to heat occurs along the abutting section 200W. The diffusion weld region of both metals (the pump housing 1 and the housing 205 of the intake valve mechanism), inclined to the axial line of the hole 200H in the pump housing 1, is then formed at the abutting section 200W by the plastic flow and the relative pressurization. Thus, the plastic flow regions of the metals are formed along the diffusion weld region, at both sides thereof.

Additionally, the abutting section M at which the distal end of the electromagnetically driven intake valve mechanism 200 abuts around the intake entrance 12A of the pressurizing chamber 12 restricts the axial relative displacements occurring when the plastic flow regions of the housing 205 of the intake valve mechanism and the pump housing 1 are formed. Furthermore, a sealing portion between the pressurizing chamber 12 and the low-pressure fuel pathway 10a is formed at the abutting section M.

Pressurization for welding is conducted before a solenoid 208 with a coil 204 wound therearound is mounted. The housing 205 of the electromagnetically driven intake valve mechanism 200 is pushed into the pump housing 1 by pressurizing an edge PA of the solenoid storage casing 205A shown in FIG. 16.

Figure 13:
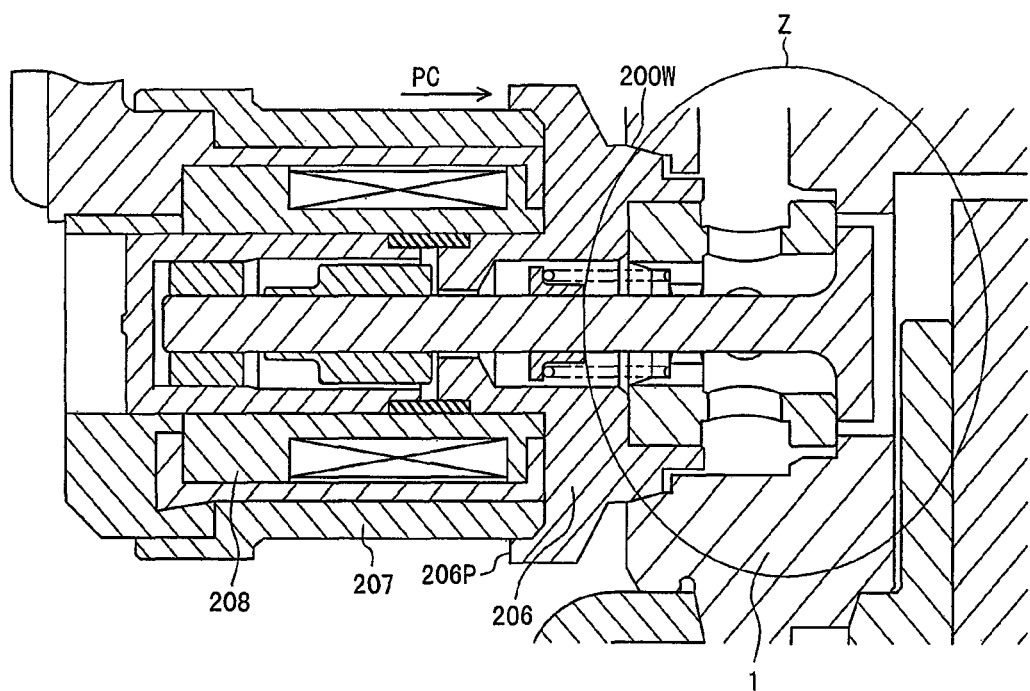
FIG. 13 is an enlarged cross-sectional view of an electromagnetically driven intake valve mechanism in the high-pressure fuel supply pump of FIG. 11.
Figure 14:
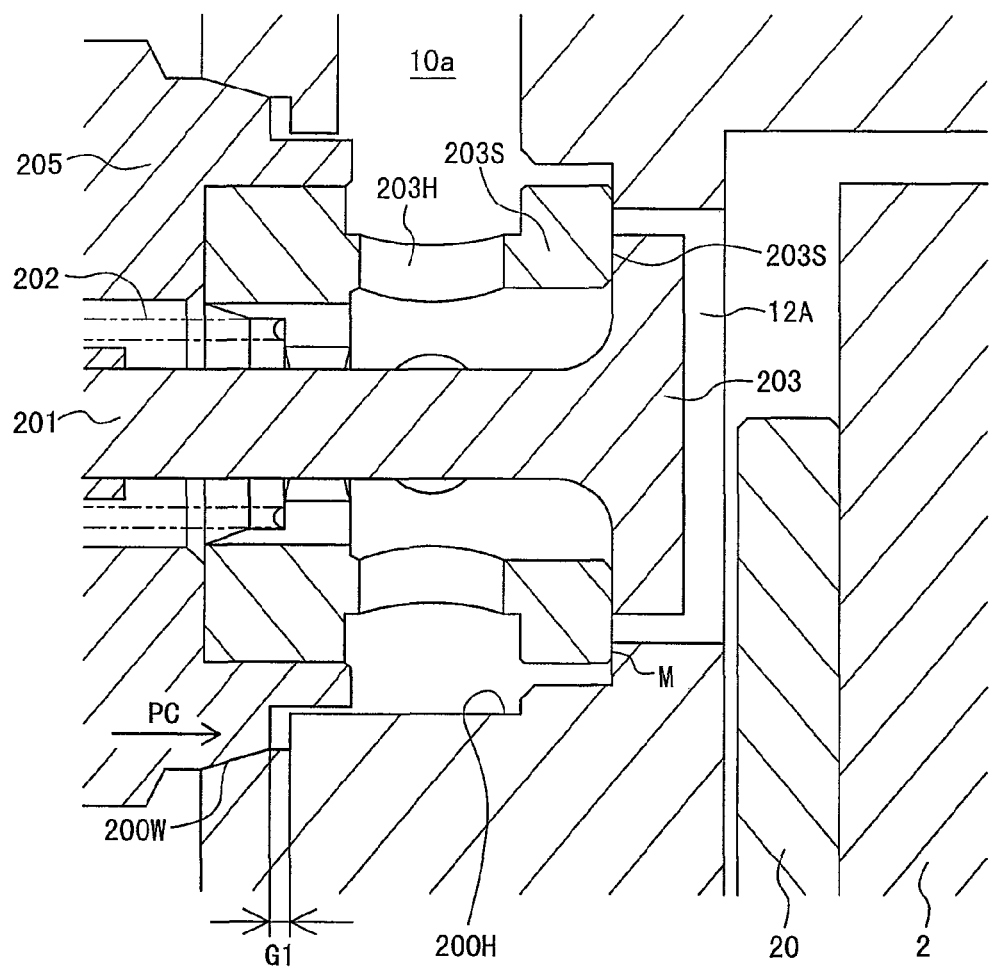
FIG. 14 is an enlarged view of section X shown in FIG. 13.

Alternatively, as shown in FIG. 13, an annular edge 206P of a housing 206 can be pressurized with the solenoid 208 mounted in place.

In either case, the plunger rod 201, the intake valve 203, the valve seat 203S, and a distal-end unit with a plurality of holes are assembled into a distal-end inner surface of the housing 205 before welding is conducted. Since temperature of the housing 205 which forms a magnetic pathway does not become too high during welding, the housing 205 does not change in magnetic characteristics.

Neither does the welding heat change the press-fitting state between the distal-end unit and the housing 205.

Figure 16:
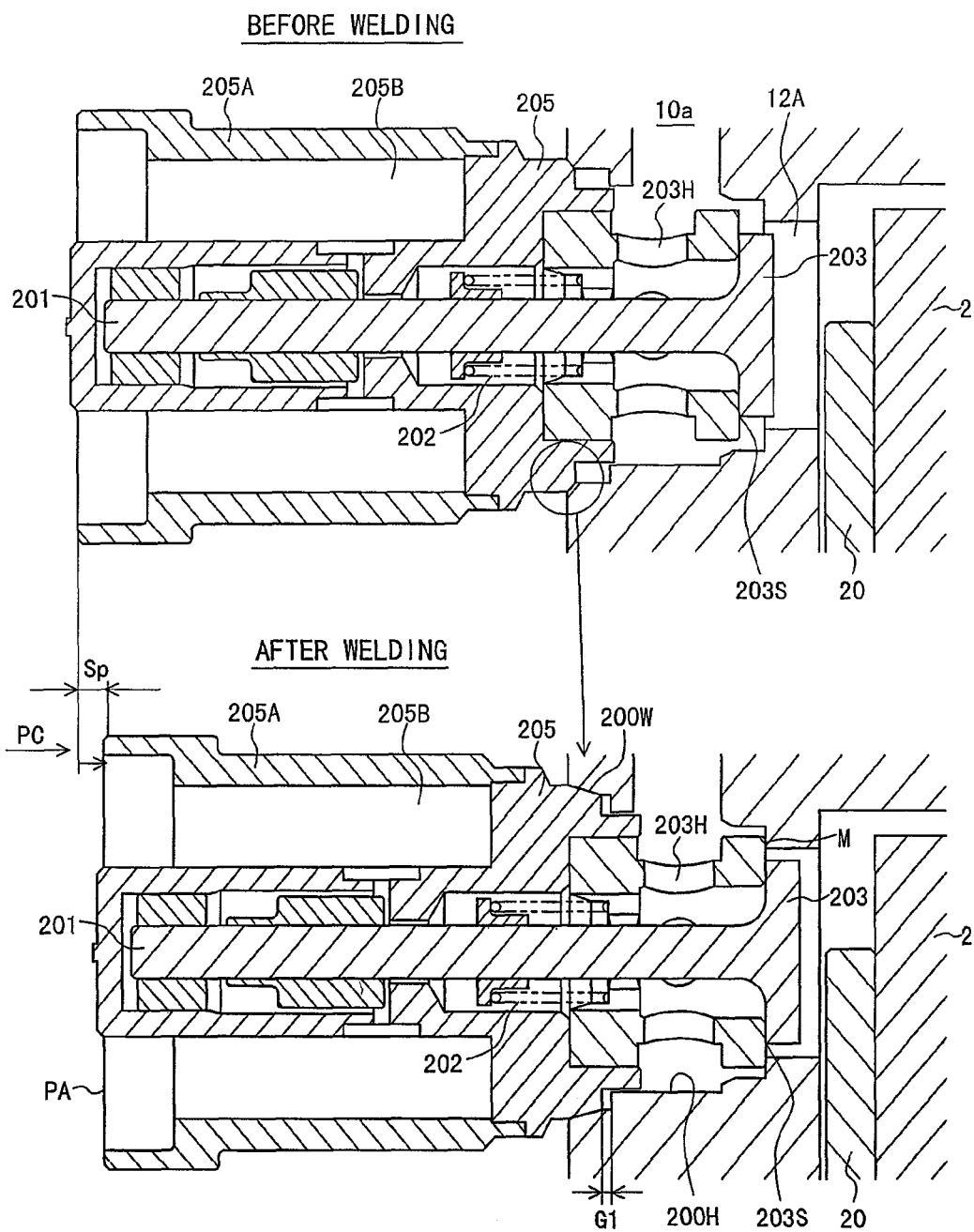
FIG. 16 is an enlarged view that shows the electromagnetically driven intake valve mechanism of FIG. 13, existing before and after being assembled.

While the press-fitting depth of the housing 205 is managed at a stepped annular surface provided around the entrance of the hole 200H, the press-fitting depth is usually adjusted for a gap G1 to exist at the position shown in FIG. 16.

Fuel is fed from the low-pressure fuel pathway 10a through the plurality of holes 203H in the distal-end unit to the valve seat 203S.

The intake valve body 203 uses a differential fluid pressure between its upstream and downstream ends to leave the valve seat 203S in defiance of the force of the spring 202. Current is supplied to the solenoid 208 in that state, and the open valve state of the intake valve body 203 is maintained. When the current to the solenoid 208 is shut off in discharge timing, the intake valve body 203 is closed by the differential fluid pressure between its upstream and downstream ends, and the force of the spring 202.

The above embodiments are summarized below.

First Embodiment

A welded structure formed in solid-state welded form by first providing an inclined abutting surface upon both of two metals to be joined together by resistance welding, then after connecting an electrode of different polarity to each metal and heating both metals with an electric current and frictional pressurizing, creating an alloy zone (diffusion zone) at a contact interface of that connection.

Second Embodiment

The welded structure according to the first embodiment, wherein the abutting surfaces are formed into an inclined annular shape and both metals are joined together so as to match respective central axes to each other along the inclined surfaces when pressurized and joined.

Third Embodiment

The welded structure according to either the first or second embodiment, wherein, when a difference in hardness is provided between the two metals to be joined together, the abutting surface of the harder metal becomes convexed in shape and the metallic materials that protrude from the weld surface essentially concentrate at one side before being pushed out from the weld surface.

Fourth Embodiment

The welded structure according to any one of the first to third embodiments, wherein an edge of the weld surface includes a storage portion for accommodating the metallic materials that protrude from the weld surface.

Fifth Embodiment

The welded structure according to the fourth embodiment, wherein the storage portion is a space formed of a groove or stepped portion provided on the surface of at least either of the two metals.

Sixth Embodiment

The welded structure according to any one of the first to fifth embodiments, wherein the two metals joined are different kinds of metals.

Seventh Embodiment

The welded structure according to any one of the first to sixth embodiments, wherein, between the two metals joined, a third metal is fixed in a sandwiched condition.

Eighth Embodiment

A high-pressure fuel pump for use in an internal-combustion engine, comprising: a pump housing, a plunger formed in the pump housing and constructed so as to reciprocate for increasing an in-cylinder pressure; and a cylinder formed as a separate body to retain the plunger under a slidable state thereof, the cylinder being connected to the pump housing by welding; wherein the structure according to any one of the first to seventh embodiments is formed as a welded structure of the connection between the cylinder and the pump housing.

Ninth Embodiment

A high-pressure fuel pump for use in an internal-combustion engine, comprising: a pump housing; a plunger reciprocated to increase an in-cylinder pressure; a cylinder as a separate body to retain the plunger under a slidable state thereof; and a cylinder holder for fixing the cylinder to the pump housing, the cylinder being connected to the pump housing via the cylinder holder by welding; wherein the structure according to any one of the first to seventh embodiments is formed as a welded structure of the connection between the cylinder holder and the pump housing.

Tenth Embodiment

A high-pressure fuel pump for use in an internal-combustion engine, wherein a flange as a separate body for installing the pump in the engine is connected to a pump housing by welding, and wherein the structure according to any one of the first to seventh embodiments is formed as a welded structure of the connection between the flange and the pump housing.

Eleventh Embodiment

A high-pressure fuel pump for use in an internal-combustion engine, wherein an intake joint as a separate body for feeding a fuel into a pressurizing chamber is connected to a pump housing by welding, and wherein the structure according to any one of the first to seventh embodiments is formed as a welded structure of the connection between the intake joint and the pump housing.

Twelfth Embodiment

A high-pressure fuel pump for use in an internal-combustion engine, wherein a discharge joint as a separate body for discharging a compressed fuel is connected to a pump housing by welding, and wherein the structure according to any one of the first to seventh embodiments is formed as a welded structure of the connection between the discharge joint and the pump housing.

Thirteenth Embodiment

A high-pressure fuel pump for use in an internal-combustion engine, comprising: a damper chamber that contains a pulsation-absorbing damper midway on a pathway extending from a fuel intake pathway to a pressurizing chamber, the damper chamber being formed at an edge of a pump housing by the pump housing and a damper cover made of a material different from that of the pump housing, and the damper cover being connected to the pump housing by welding; wherein the structure according to any one of the first to seventh embodiments is formed as a welded structure of the connection between the damper cover and the pump housing.

Fourteenth Embodiment

A high-pressure fuel pump for use in an internal-combustion engine, comprising: a damper chamber that contains a pulsation-absorbing damper midway on a pathway extending from a fuel intake pathway to a pressurizing chamber; a communicating pathway extending from the damper chamber to a discharge pathway; and a pressure regulator mechanism (also referred to as a relief valve) provided as a separate body in the communicating pathway so as to open when a fuel discharge pressure exceeds a predetermined level, the pressure regulator mechanism having a housing connected to a pump housing by welding; wherein the structure according to any one of the first to seventh embodiments is formed as a welded structure of the connection between the pressure regulator mechanism and the pump housing.

Fifteenth Embodiment

A welding method for joining two metals together in solid-state welded form in a welded pump structure, the welding method comprising: providing an inclined abutting surface upon both of the two metals to be connected together by welding; and creating an alloy zone (diffusion zone) at a contact interface by supplying an electric current to the connection instantaneously during pressurization.

The advantageous effects of the above embodiments are summarized below.

According to any one of the embodiments described above, a high-pressure fuel supply pump can be provided that makes the welding strength, airtightness, and dimensional accuracy of a connection between components of the pump achievable and is high in quality, productivity, and reliability.

More specifically, minimum thermal deformation and high strength, airtightness, and dimensional accuracy have been simultaneously achievable by providing an inclined abutting surface on both of two metals, instantaneously applying frictional heat by pressure application and heating with an electric current, and conducting solid-state welding after creating a diffusion zone at the contact interface of the connection between both metals.

In addition, since a structure characterized by minimum thermal distortion, high accuracy, and excellent airtightness, can be obtained, a highly reliable high-pressure fuel supply pump can be provided.

The following embodiment reflect the claims 12 to 18, 20, 21, 25, 27, 31, and 33 to 42 of the Japanese Patent Application filled on which the present application is based, and those modes are not newly-contrived ones.

First Mode

The first mode includes a method for manufacturing a high-pressure fuel supply pump, the method comprising:
applying a high voltage between the pump housing and the cylinder;
pressing the pump housing and the cylinder against each other while heating a peripheral region of the joining surface between the pump housing and the cylinder by using an electric current flowing to the joining surface; and
thus after generating, along the joining surface, a plastic flow free from melting or fusion due to heat, forming diffusion-weld regions of metals of the pump housing and the cylinder at the joining surface by using the plastic flow and the relative pressurization.

Second Mode

The second mode includes a method for manufacturing a high-pressure fuel supply pump, the method comprising:
applying a high voltage between the pump housing and the fixing ring;
pressing the pump housing and the fixing ring against each other while heating a peripheral region of the joining surface between the pump housing and the fixing ring by using an electric current flowing to the joining surface; and
thus after generating, along the joining surface, a plastic flow free from melting or fusion due to heat, forming diffusion-weld regions of metals of the pump housing and the fixing ring at the joining surface by using the plastic flow and the relative pressurization.

Third Mode

The third mode includes a high-pressure fuel supply pump manufacturing method, wherein part or all of the force applied during the relative pressurization of the pump housing and the cylinder is used as a force applied to form a metal contact sealing section between the pump housing and the cylinder.

Fourth Mode

The high-pressure fuel supply pump according to claim 2, wherein:
at a smaller-diameter-side end portion of the welded connection surface, an annular space that looks over the smaller-diameter lateral edge of the welded connection surface is provided on at least either the pump housing or the cylinder.

Fifth Mode

The fourth mode includes a method for manufacturing a high-pressure fuel supply pump, the method comprising:
applying a high voltage between the pump housing and the cylinder;
pressing the pump housing and the cylinder against each other while heating a peripheral region of the joining surface between the pump housing and the cylinder by using an electric current flowing to the joining surface;
thus after generating, along the joining surface, a plastic flow free from melting or fusion due to heat, forming diffusion-weld regions of metals of the pump housing and the cylinder at the joining surface by using the plastic flow and the relative pressurization; and
capturing in the space the plastic flow materials flowing out from an edge of the joining surface.

Sixth Mode

The high-pressure fuel supply pump according to claim 6, wherein:
at a smaller-diameter lateral edge of the welded connection surface, an annular space that looking over the smaller-diameter lateral edge of the welded connection surface is provided on at least either the pump housing or the fixing ring.

Seventh Mode

The fifth mode includes a method for manufacturing a high-pressure fuel supply pump, the method comprising:
applying a high voltage between the pump housing and the fixing ring;
pressing the pump housing and the fixing ring against each other while heating a peripheral region of the joining surface between the pump housing and the fixing ring by using an electric current flowing to the joining surface;
thus after generating, along the joining surface, a plastic flow free from melting or fusion due to heat, forming diffusion-weld regions of metals of the pump housing and the fixing ring at the joining surface by using the plastic flow and the relative pressurization; and
capturing in the space the plastic flow materials flowing out from an edge of the joining surface.

Eighth Mode

The sixth mode includes a method for manufacturing a high-pressure fuel supply pump, the method comprising:
applying a high voltage between the pump housing and the cylinder or between the pump housing and the fixing ring;
pressing the pump housing and the cylinder or the fixing ring against each other while heating a peripheral region of the joining surface between the pump housing and the cylinder or the fixing ring by using an electric current flowing to the joining surface; and
thus after generating, along the joining surface, a plastic flow free from melting or fusion due to heat, forming diffusion-weld regions of metals of the pump housing and the cylinder or the fixing ring by using the plastic flow and the relative pressurization;
wherein the plastic flow at the joining surface causes the pump housing and the cylinder or the fixing ring to change respective axial and radial relative positions and hence to be centered with respect to each other automatically.

Ninth Mode

The high-pressure fuel supply pump according to claim 2, wherein:
the joining surface of the pump housing is of a concave shape, the cylinder has a joining surface of a convex shape, and the metal formed into the convex shape is harder than the metal formed into the concave shape.

Tenth Mode

The high-pressure fuel supply pump according to claim 16, wherein:

at a smaller-diameter lateral edge of the welded connection surface, an annular space that looking over the smaller-diameter lateral edge of the welded connection surface is provided on at least either the pump housing or the installation flange.

Eleventh Mode

The seventh mode includes a method for manufacturing a high-pressure fuel supply pump, the method comprising:

applying a high voltage between the pump housing and the installation flange;

pressing the pump housing and the installation flange against each other while heating a peripheral region of the joining surface between the pump housing and the installation flange by using an electric current flowing to the joining surface; and thus after generating, along the joining surface, a plastic flow free from melting or fusion due to heat, forming diffusion-weld regions of metals of the pump housing and the installation flange by using the plastic flow and the relative pressurization;

wherein the plastic flow at the joining surface causes the pump housing and the installation flange to change respective axial and radial relative positions and hence to be centered with respect to each other automatically.

Twelfth Mode

The high-pressure fuel supply pump according to claim 21, wherein:

at a smaller-diameter lateral edge of the welded connection surface, an annular space that looking over the smaller-diameter lateral edge of the welded connection surface is provided in at least either the pump housing and intake joint section or the pump housing and discharge joint section.

Thirteenth Mode

The eighth mode includes a method for manufacturing a high-pressure fuel supply pump, the method comprising:

applying a high voltage between the pump housing and the intake joint or the discharge joint;

pressing the pump housing and the intake joint or the discharge joint against each other while heating a peripheral region of the joining surface between the pump housing and the intake joint or the discharge joint by using an electric current flowing to the joining surface; and thus after generating, along the joining surface, a plastic flow free from melting or fusion due to heat, forming diffusion-weld regions of metals of the pump housing and the discharge joint, as well as the diffusion-weld regions of metals of the pump housing and the intake joint, by using the plastic flow and the relative pressurization;

wherein the plastic flow at the joining surface causes the pump housing and the intake joint or the discharge joint to change respective axial and radial relative positions and hence to be centered with respect to each other automatically.

Fourteenth Mode

A high-pressure fuel supply pump, comprising:

a pump housing with a damper chamber containing a pulsation-absorbing damper midway on a pathway extending from a fuel intake pathway to a pressurizing chamber; and a damper cover fixed to the pump housing in order to define the damper chamber, the damper cover being connected to a cylindrical outer wall of the pump housing by welding; wherein:

the welded connection between the damper cover and the pump housing includes a connection surface inclined to a central axis of the cylindrical outer wall; and diffusion-weld regions of metals of the pump housing and damper cover free from melting or fusion due to heat form a sealing portion between an internal fluid and atmospheric air, the diffusion-weld regions themselves being formed upon the inclined connection surface.

Fifteenth Mode

The ninth mode includes a method for manufacturing a high-pressure fuel supply pump, wherein:

the damper is constructed as a metallic diaphragm damper formed by welding outer surfaces of two metallic diaphragms;

the pump further includes a retaining member for holding both lateral faces of the metallic diaphragm damper in sandwiched form at an inside-diametral side of an outer-surface weld of the metallic diaphragm damper; and the pump is constructed such that after the retaining member has been pressed and held into position using the damper cover, the metallic diaphragm damper is fixed to inside of the damper chamber;

wherein a high voltage is applied between the pump housing and the damper cover and then while a peripheral region of the joining surface between the pump housing and the damper cover is being heated with an electric current flowing to the joining surface, the pump housing and the damper cover are pressed against each other, whereby a plastic flow free from melting or fusion due to heat is generated along the joining surface, and then, diffusion-weld regions of metals of the pump housing and the damper cover are formed using the plastic flow and the relative pressurization.

Sixteenth Mode

A high-pressure fuel pump for use in an internal-combustion engine, comprising:

a pump housing with a pressurizing chamber;

a discharge valve provided at an exit of the pressurizing chamber;

a relief pathway connecting a downstream side of the discharge valve and an upstream side thereof; and a relief valve mechanism provided on the relief pathway so as to open when a discharge pressure of a fuel exceeds a predetermined level;

wherein:

a tubular housing that constitutes the relief valve mechanism is fitted into a hole provided in the pump housing, and the relief valve mechanism is mounted in the pump housing;

a welded connection with a connection surface inclined to a central axis of the tubular housing is formed at the fitting-in section between the tubular housing of the relief valve mechanism and the pump housing; and a diffusion-weld region of a metal of the tubular housing of the relief valve mechanism, and a diffusion-weld region of a metal of the pump housing form a sealing portion between a high-pressure fuel section at a downstream side of the relief valve and a low-pressure fuel section at an upstream side of the relief valve, the diffusion-weld regions themselves being formed upon the inclined connection surface, and the tubular housing and the pump housing both being free from melting or fusion due to heat.

Seventeenth Mode

The tenth mode includes a method for manufacturing a high-pressure fuel supply pump, the method comprising:

inserting the relief valve mechanism from outside of the pump housing into the hole thereof so as to abut an outer surface of a housing of the relief valve mechanism upon an entrance inner surface of the hole;

supplying an electric current to the abutting section between the pump housing and the housing of the relief valve mechanism by applying a high voltage between both housings;

pressing the pump housing and the housing of the relief valve mechanism against each other while heating the abutting section using the current supplied thereto; and thus after generating, along the abutting section, a plastic flow free from melting or fusion due to heat, forming a diffusion-weld region of metals of the pump housing and relief valve mechanism's housing inclined to an axial line of the hole in the pump housing, by using the plastic flow and the relative pressurization;

wherein a plastic flow region of metals of the pump housing and the housing of the relief valve mechanism is formed along the diffusion-weld region, at both sides thereof.

Eighteenth Mode

A high-pressure fuel supply pump for use in an internal-combustion engine, comprising:

a pump housing with a pressurizing chamber;
an intake valve mechanism integrally constructed of an intake valve provided at an entrance of the pressurizing chamber, and of an electromagnetic driving mechanism that controls open/close timing of the intake valve; and
a housing that forms part of an outer shell of the intake valve mechanism, the housing further constituting part of a magnetic pathway of the electromagnetic driving mechanism;

wherein:

the housing of the intake valve mechanism has an outer-surface tubular section fixedly fitted into a hole of the pump housing;

a welded connection with a connection surface inclined to a central axis of the housing is formed at the fitting-in section between the outer-surface tubular section of the housing and the pump housing; and a diffusion-weld region of a metal of the tubular housing of the intake valve mechanism, and a diffusion-weld region of a metal of the pump housing form a sealing portion between a fuel pathway on which the intake valve mechanism is installed, and atmospheric air, the diffusion-weld regions themselves being formed upon the inclined connection surface, and the tubular housing and the pump housing both being free from melting or fusion due to heat.

Nineteenth Mode

The high-pressure fuel supply pump according to in eighteenth mode, wherein:

an abutting section at which a distal end of the intake valve mechanism abuts a peripheral portion of an intake port of the pressurizing chamber formed in the pump housing is provided as a restrictor to restrict axial relative displacements occurring during the formation of the plastic flow regions of the pump housing and the tubular housing of the intake valve mechanism.

Twentieth Mode

The high-pressure fuel supply pump according to nineteenth mode, wherein:

the abutting section functions as a sealing surface to seal both the pressurizing chamber and a fuel pathway located upstream with respect to the intake valve.

Twenty-First Mode

The eleventh mode includes a method for manufacturing a high-pressure fuel supply pump, the method comprising:

inserting the intake valve mechanism from outside of the pump housing into the hole thereof so as to abut an outer surface of a housing of the intake valve mechanism upon an entrance inner surface of the hole;

supplying an electric current to the abutting section between the pump housing and the housing of the intake valve mechanism by applying a high voltage between both housings;

pressing the pump housing and the housing of the intake valve mechanism against each other while heating the abutting section using the current supplied thereto; and thus after generating, along the abutting section, a plastic flow free from melting or fusion due to heat, forming a diffusion-weld region of metals of the pump housing and intake valve mechanism's housing inclined to an axial line of the hole in the pump housing, by using the plastic flow and the relative pressurization;

wherein a plastic flow region of metals of the pump housing and the housing of the intake valve mechanism is formed along the diffusion-weld region, at both sides thereof.

Twenty-Second Mode

The twelfth mode includes a method for manufacturing a high-pressure fuel supply pump, the method comprising:

providing an abutting section at which a distal end of the intake valve mechanism abuts upon a peripheral region of an intake port of the pressurizing chamber;

inserting the intake valve mechanism from outside of the pump housing into the hole thereof so as to abut an outer surface of a housing of the intake valve mechanism upon an entrance inner surface of the hole;

supplying an electric current to the abutting section between the pump housing and the housing of the intake valve mechanism by applying a high voltage between both housings;

pressing the pump housing and the housing of the relief valve mechanism against each other while heating the abutting section using the current supplied thereto; and thus after generating, along the abutting section, a plastic flow free from melting or fusion due to heat, forming a diffusion-weld region of metals of the pump housing and intake valve mechanism's housing inclined to an axial line of the hole in the pump housing, by using the plastic flow and the relative pressurization;

wherein:

a plastic flow region of metals of the pump housing and the housing of the intake valve mechanism is formed along the diffusion-weld region, at both sides thereof;

the abutting section at which the distal end of the intake valve mechanism abuts upon the peripheral region of the intake port of the pressurizing chamber restricts axial relative displacements occurring during the formation of the plastic flow regions of the pump housing and the intake valve mechanism's housing; and at the abutting section, a sealing portion is formed between the pressurizing chamber and a low-pressure fuel pipeline.

The present invention can be used in wide applications to connect two metals together at an annular section by welding. This connection can maintain a sufficient sealing state against a fluid, so the invention can be used in the apparatuses and devices that handle various substances from the liquids and gaseous bodies of general pressures to high-pressure gasoline and chemicals. This Specification has described examples of applying the invention to a high-pressure fuel supply pump for use in a so-called in-cylinder injection type of internal-combustion engine designed to inject gasoline, in particular, directly into a combustion chamber.

What is claimed is:

1. A high-pressure fuel supply pump, comprising:
a pump housing with a recess formed therein to form a pressurizing chamber;

a first cylindrical surface formed on an inner wall of the recess;

a cylinder having, on its outer surface, a second cylindrical surface fitted into the first cylindrical surface, and at a central section, a through-hole with one end thereof apertured toward the pressurizing chamber;

a piston plunger that takes a fluid into the pressurizing chamber by repeating reciprocation under a slidingly fitted condition in the through-hole, and discharges the fluid from the pressurizing chamber under pressure; and a welded connection that maintains the pump housing and the cylinder in a fitting-in state of the housing and cylinder, thereby to prevent both from sliding out from each other; wherein:

the welded connection forms an alloyed diffusion zone inclined to a central axis of the cylinder and interposed between a first metal of which the pump housing is formed and a second metal of which the cylinder is formed to permit joinder of dissimilar first and second metals; and plastic flow zones of metals of the pump housing and the cylinder are formed at opposed ends of the alloyed diffusion zone so that the alloyed diffusion zone is sandwiched between the plastic flow zones.

2. The high-pressure fuel supply pump according to claim 1, wherein:

the welded connection is formed between the first cylindrical surface of the pump housing and the second cylindrical surface of the cylinder;

the welded connection forms a joining surface inclined to the central axis of the cylinder; and the alloyed diffusion zone is formed at the inclined joining surface.

3. The high-pressure fuel supply pump according to claim 1, wherein:

at the fitting-in section between the pump housing and the cylinder, an axial abutting surface is provided as a restrictor to restrict axial relative displacements occurring during the formation of the plastic flow zones of the pump housing and the cylinder.

4. The high-pressure fuel supply pump according to claim 1, wherein:

the alloyed diffusion zone and welded metal free from melting or fusion due to heat form a seal between the pressurizing chamber and atmospheric air.

5. The high-pressure fuel supply pump according to claim 2, wherein:

central axes of the pump housing and the cylinder are formed on a coaxial line at least in an axial region having the welded connection formed therein.

6. A high-pressure fuel supply pump, comprising:

an installation flange for installing a pump housing at an installation member; and a cylindrical section formed on an outer surface of the pump housing; wherein:

part of the cylindrical section is fitted into an inner wall of a hole provided in the installation flange, and the cylindrical section and the flange are connected together at the fitting-in section by welding;

the welded connection includes an alloyed diffusion zone inclined to a central axis of the cylindrical section and interposed between a first metal of which the installation flange is formed and a second metal of which the cylindrical section is formed to permit joinder of dissimilar first and second metals; and a plastic flow region of the metal of the pump housing and a plastic flow region of the metal of the installation flange are formed at opposed ends of the alloyed diffusion zone so that the alloyed diffusion zone is sandwiched between the plastic flow regions.

7. The high-pressure fuel supply pump according to claim 6, wherein:

at the fitting-in section between the pump housing and the installation flange, an axial abutting surface is provided as a restrictor to restrict axial relative displacements occurring during the formation of the plastic flow regions of the pump housing and the installation flange.

8. The high-pressure fuel supply pump according to claim 6, wherein:

the central axis of the cylindrical section provided on the outer surface of the pump housing, and a central axis of the hole provided in the installation flange are formed on a coaxial line at least in an axial region having the welded connection formed therein.

9. A high-pressure fuel supply pump, comprising:

an intake joint for introducing a fluid into a pump housing, or a discharge joint; and an outer-surface cylindrical section of the intake joint or of the discharge joint, the intake joint or the discharge joint being connected to the pump housing by welding with the cylindrical section fitted into a hole formed in the pump housing; wherein:

the welded connection to the intake joint or to the discharge joint includes an alloyed diffusion zone inclined to a central axis of the cylindrical section and interposed between a first metal of which the intake joint is formed and a second metal of which the pump housing is formed to permit joinder of dissimilar first and second metals; and a plastic flow region of the metal of the pump housing and a plastic flow region of the metal of the intake joint or discharge joint are formed at opposed ends of the alloyed diffusion zone so that the alloyed diffusion zone is sandwiched between the plastic flow regions.

10. The high-pressure fuel supply pump according to claim 9, wherein:

at the fitting-in section between the pump housing and the intake joint or the discharge joint, an axial abutting surface is provided as a restrictor to restrict axial relative displacements occurring during the formation of the plastic flow regions of the pump housing and the intake joint or discharge joint.

11. The high-pressure fuel supply pump according to claim 9, wherein:

the central axis of the cylindrical section formed on an outer surface of the intake joint or discharge joint, and a central axis of the hole provided in the pump housing are formed on a coaxial line at least in an axial region having the welded connection formed therein.

12. The high-pressure fuel supply pump according to claim 1, wherein the plastic flow zones are received in storage volumes defined in at least one of the pump housing and the cylinder.

13. The high-pressure fuel supply pump according to claim 6, wherein the plastic flow zones are received in storage volumes defined in at least one of the pump housing and the cylinder.

14. The high-pressure fuel supply pump according to claim 9, wherein the plastic flow zones are received in storage volumes defined in at least one of the pump housing and the cylinder.

* * * * *